United States Patent
Morioka

(10) Patent No.: US 11,956,089 B2
(45) Date of Patent: Apr. 9, 2024

(54) COMMUNICATION DEVICE AND COMMUNICATION METHOD

(71) Applicant: SONY CORPORATION, Tokyo (JP)

(72) Inventor: Yuichi Morioka, Tokyo (JP)

(73) Assignee: SONY CORPORATION, Tokyo (JP)

(*) Notice: Subject to any disclaimer, the term of this patent is extended or adjusted under 35 U.S.C. 154(b) by 545 days.

(21) Appl. No.: 17/250,300

(22) PCT Filed: Jun. 21, 2019

(86) PCT No.: PCT/JP2019/024641
§ 371 (c)(1),
(2) Date: Dec. 29, 2020

(87) PCT Pub. No.: WO2020/008908
PCT Pub. Date: Jan. 9, 2020

(65) Prior Publication Data
US 2021/0273754 A1 Sep. 2, 2021

(30) Foreign Application Priority Data
Jul. 6, 2018 (JP) ................. 2018-129069

(51) Int. Cl.
*H04W 72/56* (2023.01)
*H04L 1/22* (2006.01)
*H04W 72/0453* (2023.01)

(52) U.S. Cl.
CPC ........... *H04L 1/22* (2013.01); *H04W 72/0453* (2013.01); *H04W 72/56* (2023.01)

(58) Field of Classification Search
CPC ... H04L 1/22; H04L 1/08; H04L 1/189; H04L 1/1896; H04L 1/00; H04W 72/0453; H04W 72/56; H04W 84/12
See application file for complete search history.

(56) References Cited

U.S. PATENT DOCUMENTS 10,764,946 B2 * 9/2020 Sihlbom ............... H04W 40/22
2005/0013269 A1 1/2005 Han et al.
(Continued)

FOREIGN PATENT DOCUMENTS

| CN | 1578224 A | 2/2005 |
| CN | 102577455 A | 7/2012 |

(Continued)

OTHER PUBLICATIONS

International Search Report and Written Opinion of PCT Application No. PCT/JP2019/024641, dated Aug. 13, 2019, 10 pages of ISRWO.

*Primary Examiner* — Lan-Huong Truong
(74) *Attorney, Agent, or Firm* — CHIP LAW GROUP

(57) ABSTRACT

The present technology relates to a communication device and a communication method that can achieve communication that has high reliability and low delay. Provided is a communication device that constitutes a base station, the communication device including a control unit that performs a control that generates redundancy information regarding a provision of redundancy for transmission data transmitted by a terminal station or the base station, and multiplexing information regarding multiplexing of the transmission data, and transmits the redundancy information and the multiplexing information that have been generated to the terminal station.

15 Claims, 14 Drawing Sheets

(56) References Cited

U.S. PATENT DOCUMENTS

| | | | |
|---|---|---|---|
| 2010/0296459 A1* | 11/2010 | Miki | H04L 5/0007 370/329 |
| 2012/0243450 A1 | 9/2012 | Ishii et al. | |
| 2013/0223343 A1 | 8/2013 | Wentink et al. | |
| 2017/0250784 A1 | 8/2017 | Sakai | |
| 2018/0279342 A1* | 9/2018 | Takiguchi | H04W 72/21 |
| 2018/0359123 A1 | 12/2018 | Kimura et al. | |

FOREIGN PATENT DOCUMENTS

| | | | | |
|---|---|---|---|---|
| CN | 104137434 A | 11/2014 | | |
| EP | 1499079 A2 | 1/2005 | | |
| EP | 2487945 A1 | 8/2012 | | |
| EP | 2817891 A1 | 12/2014 | | |
| EP | 3399677 A1 | 11/2018 | | |
| JP | 2005-039775 A | 2/2005 | | |
| JP | 2013-197996 A | 9/2013 | | |
| JP | 2013197996 A | * 9/2013 | | H04W 72/04 |
| JP | 2014-502453 A | 1/2014 | | |
| JP | 2015-513258 A | 4/2015 | | |
| KR | 20030021937 A | 3/2003 | | |
| KR | 100526183 B1 | 11/2005 | | |
| KR | 10-2014-0129226 A | 11/2014 | | |
| TW | 201735574 A | 10/2017 | | |
| WO | 2011/043392 A | 4/2011 | | |
| WO | 2013/126678 A1 | 8/2013 | | |
| WO | 2017/115609 A1 | 7/2017 | | |

\* cited by examiner

COMMUNICATION DEVICE AND COMMUNICATION METHOD

CROSS REFERENCE TO RELATED APPLICATIONS

This application is a U.S. National Phase of International Patent Application No. PCT/JP2019/024641 filed on Jun. 21, 2019, which claims priority benefit of Japanese Patent Application No. JP 2018-129069 filed in the Japan Patent Office on Jul. 6, 2018. Each of the above-referenced applications is hereby incorporated herein by reference in its entirety.

TECHNICAL FIELD

The present technology relates to a communication device and a communication method, and particularly to a communication device and a communication method that can achieve communication that has high reliability and low delay.

BACKGROUND ART

In recent years, reliability of wireless communication needs to be increased for ultra-high-quality-image transmission such as virtual reality (VR) and augmented reality (AR), remote operation of precise machines, and the like. Furthermore, low delay is needed for applications used for ultra-high-quality-image transmission such as VR and AR, remote operation of precise machines, and the like.

For example, Patent Document 1 discloses a technology that simultaneously transmits the same protocol data unit (PDU) through a plurality of channels to increase robustness of a system.

CITATION LIST

Patent Document

Patent Document 1: Japanese Patent Application National Publication (Laid-Open) No. 2014-502453

SUMMARY OF THE INVENTION

Problems to be Solved by the Invention

However, it is difficult to say that the current technology does not sufficiently satisfy two needs for high reliability and low delay. A technology that can achieve communication that has high reliability and low delay is needed.

The present technology is made in such a situation, and can achieve communication that has high reliability and low delay.

Solutions to Problems

A communication device according to an aspect of the present technology is a communication device that constitutes a base station, the communication device including: a control unit that performs a control that generates redundancy information regarding a provision of redundancy for transmission data transmitted by a terminal station or the base station, and multiplexing information regarding multiplexing of the transmission data, and transmits the redundancy information and the multiplexing information that have been generated to the terminal station.

A communication method according to an aspect of the present technology is a communication method including allowing a communication device of a base station to: generate redundancy information regarding a provision of redundancy for transmission data transmitted by a terminal station or the base station, and multiplexing information regarding multiplexing of the transmission data; and transmit the redundancy information and the multiplexing information that have been generated to the terminal station.

In a communication device and a communication method according to an aspect of the present technology, redundancy information regarding a provision of redundancy for transmission data transmitted by a terminal station or a base station, and multiplexing information regarding multiplexing of the transmission data are generated, and the redundancy information and the multiplexing information that have been generated are transmitted to the terminal station.

A communication device according to an aspect of the present technology is a communication device that constitutes a terminal station, the communication device including: a control unit that performs a control that receives redundancy information and multiplexing information that are transmitted from a base station, the redundancy information being regarding a provision of redundancy for transmission data transmitted by the terminal station or the base station, and the multiplexing information being regarding multiplexing of the transmission data, and transmits a first frame that is a frame that contains the transmission data and is multiplexed to the base station, or receives the first frame multiplexed and transmitted from the base station, on the basis of the redundancy information and the multiplexing information that have been received.

A communication method according to an aspect of the present technology is a communication method including allowing a communication device of a terminal station to: receive redundancy information and multiplexing information that are transmitted from a base station, the redundancy information being regarding a provision of redundancy for transmission data transmitted by the terminal station or the base station, and the multiplexing information being regarding multiplexing of the transmission data; and transmit a first frame that is a frame that contains the transmission data and is multiplexed to the base station, or receive the first frame multiplexed and transmitted from the base station, on the basis of the redundancy information and the multiplexing information that have been received.

In a communication device and a communication method according to an aspect of the present technology, redundancy information and multiplexing information that are transmitted from a base station are received, the redundancy information is regarding a provision of redundancy for transmission data transmitted by a terminal station or the base station, and the multiplexing information is regarding multiplexing of the transmission data; and a first frame that is a frame that contains the transmission data and is multiplexed is transmitted to the base station, or the first frame multiplexed and transmitted from the base station is received, on the basis of the redundancy information and the multiplexing information that have been received.

Note that a communication device according to an aspect of the present technology may be a separate device, or an internal block that constitutes one device.

Effects of the Invention

According to an aspect of the present technology, communication that has high reliability and low delay can be achieved.

Note that effects described here are not necessarily limitative, but may be any effect described in the present disclosure.

MODE FOR CARRYING OUT THE INVENTION

Hereinafter, exemplary embodiments of the present technology will be described with reference to the drawings. Note that the description will be made in the following order.
1. Exemplary embodiments of the present technology
2. Variations 1. Exemplary Embodiments of the Present Technology (Configuration Example of Wireless Communication System)

Figure 1:
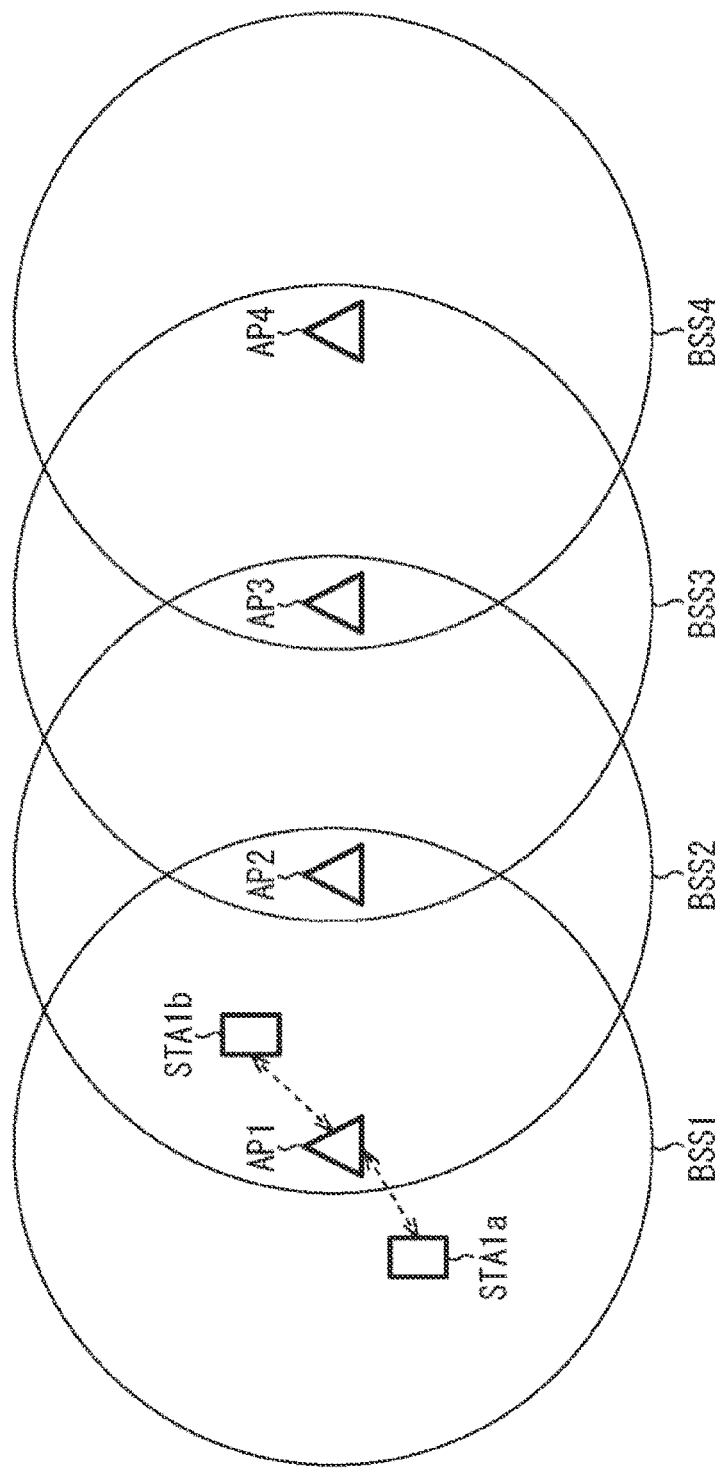
FIG. 1 is a diagram that illustrates an example of configurations of a wireless communication system.

FIG. 1 is a diagram that illustrates an example of configurations of a wireless communication system.

In FIG. 1, the wireless communication system is a system that includes a wireless local area network (LAN) that includes a plurality of networks (basic service sets (BSSs)) that includes a base station (access point (AP)), and terminal stations (stations (STA)) as terminals that are under and connected with the base station.

A network BSS1 includes a base station AP1 and a terminal station STA1$a$ and a terminal station STA1$b$ that are connected with the base station AP1. Note that dotted lines that connect the base station AP1 with the terminal station STA1$a$ and the terminal station STA1$b$ represent the connection. Furthermore, although not illustrated, terminal stations STA are connected to each of base stations AP2 to AP4 similarly to the base station AP1 to constitute networks BSS2 to BSS4, respectively.

A solid-line circle around each of the base stations AP as the centers represents a range within which each of the base stations AP can communicate, that is, a range within which signals can reach and a range within which signals can be detected. The ranges within which each of the base stations AP can communicate may overlap each other. For example, in FIG. 1, a range within which the base station AP2 can communicate includes the base station AP1 and the base station AP3.

Note that a configuration of the wireless communication system illustrated in FIG. 1 is one example. The numbers and arrangements of the base stations AP, the terminal stations STA, and the networks BSS are not limited to the example.

(Configuration Example of Communication Device)

Figure 2:
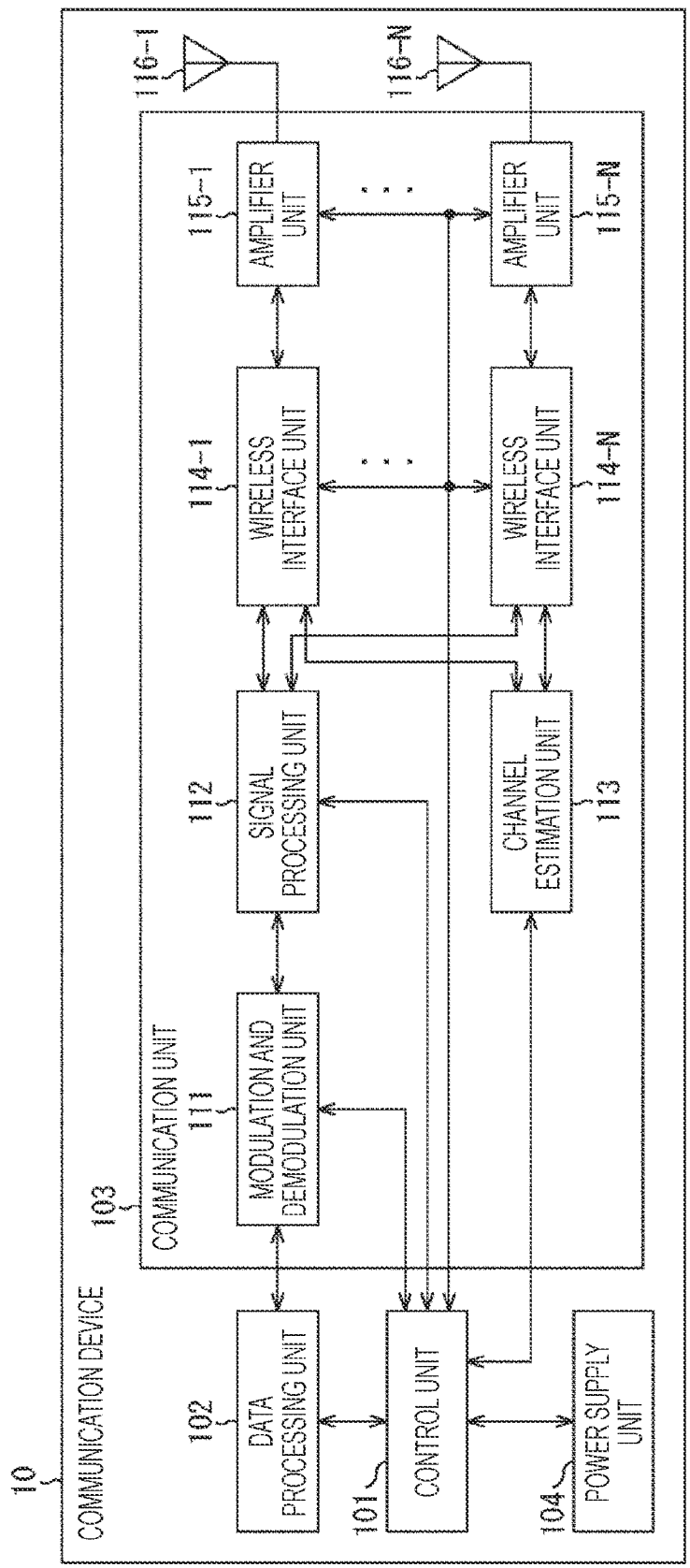
FIG. 2 is a block diagram that illustrates an example of configurations of an exemplary embodiment of a communication device to which the present technology is applied.

FIG. 2 is a block diagram that illustrates an example of configurations of one exemplary embodiment of a communication device (wireless communication device) to which the present technology is applied.

A communication device 10 illustrated in FIG. 2 is configured as the base stations AP or the terminal stations STA in the wireless communication system in FIG. 1.

In FIG. 2, the communication device 10 includes a control unit 101, a data processing unit 102, a communication unit 103, and a power supply unit 104. Furthermore, the communication unit 103 includes a modulation and demodulation unit 111, a signal processing unit 112, a channel estimation unit 113, wireless interface units 114-1 to 114-N (N: an integer equal to or larger than one), and amplifier units 115-1 to 115-N (N: an integer equal to or larger than one). Furthermore, the communication device 10 includes antennas 116-1 to 116-N (N: an integer equal to or larger than one) for (the amplifier units 115-1 to 115-N of) the communication unit 103.

The control unit 101 includes, for example, a microprocessor or a microcontroller, and controls operations of each of the units. Furthermore, the control unit 101 delivers information (data) between each of the blocks.

Furthermore, the control unit 101 schedules packets in the data processing unit 102, and sets parameters of the modulation and demodulation unit 111 and the signal processing unit 112 of the communication unit 103. Moreover, the control unit 101 sets parameters of the wireless interface units 114-1 to 114-N and the amplifier units 115-1 to 115-N. The control unit 101 controls transmission power of the wireless interface units 114-1 to 114-N and the amplifier units 115-1 to 115-N.

At a time of transmission at which data is input from a protocol upper layer, the data processing unit 102 generates, from the input data, a packet for wireless communication, applies processes such as addition of a header for media access control (MAC) and addition of an error detection code, and outputs thus obtained processed data to (the modulation and demodulation unit 111 of) the communication unit 103.

Furthermore, at a time of receipt at which data is input from (the modulation and demodulation unit 111 of) the communication unit 103, the data processing unit 102 applies processes such as analysis of an MAC header, detection of packet errors, and reordering to the input data, and outputs thus obtained processed data to the protocol upper layer.

The communication unit 103 performs processes related to wireless communication, according to controls from the control unit 101.

At a time of transmission, the modulation and demodulation unit 111 applies processes such as encoding, interleaving, and modulation to data input from the data processing unit 102, on the basis of coding and modulation schemes set by the control unit 101, and outputs thus obtained data symbol stream to the signal processing unit 112.

Furthermore, at a time of receipt, the modulation and demodulation unit 111 applies processes opposite to the processes at a time of transmission, that is, processes such as demodulation, deinterleaving, and decoding to a data symbol stream input from the signal processing unit 112, on the basis of coding and demodulation schemes set by the control unit 101, and outputs thus obtained processed data to the control unit 101 or the data processing unit 102.

At a time of transmission, the signal processing unit 112 applies processes such as signal processing for spatial division to a data symbol stream input from the modulation and demodulation unit 111, as necessary, and outputs thus obtained at least one transmission symbol stream to the wireless interface units 114-1 to 114-N, respectively.

Furthermore, at a time of receipt, the signal processing unit 112 applies processes such as signal processing for spatial division of a stream to a received symbol stream input from each of the wireless interface units 114-1 to 114-N, as necessary, and outputs thus obtained data symbol stream to the modulation and demodulation unit 111.

The channel estimation unit 113 calculates a complex channel gain information on a radio channel, from a preamble part and a training signal part of a signal input from each of the wireless interface units 114-1 to 114-N. The complex channel gain information calculated by the channel estimation unit 113 is used for a demodulation process in the modulation and demodulation unit 111 and a spatial process in the signal processing unit 112, through the control unit 101.

At a time of transmission, the wireless interface unit 114-1 converts a transmission symbol stream input from the signal processing unit 112 into an analog signal, applies processes such as filtering and upconversion to a carrier wave frequency on the analog signal, and outputs (feeds) thus obtained transmission signal to the amplifier unit 115-1 or the antenna 116-1.

Furthermore, at a time of receipt, the wireless interface unit 114-1 applies processes opposite to the processes at a time of transmission, that is, processes such as downconversion to a received signal input from the amplifier unit 115-1 or the antenna 116-1, and outputs thus obtained received symbol stream to the signal processing unit 112.

At a time of transmission, the amplifier unit 115-1 amplifies a transmission signal (analog signal) input from the wireless interface unit 114-1 to a predetermined electric power, and outputs the amplified transmission signal (analog signal) to the antenna 116-1. Furthermore, at a time of receipt, the amplifier unit 115-1 amplifies a received signal (analog signal) input from the antenna 116-1 to a predetermined electric power, and outputs the amplified received signal (analog signal) to the wireless interface unit 114-1.

Note that the wireless interface units 114-2 to 114-N are configured similarly to the wireless interface unit 114-1, the amplifier units 115-2 to 115-N are configured similarly to the amplifier unit 115-1, and the antennas 116-2 to 116-N are configured similarly to the antenna 116-1. Therefore, the wireless interface units 114-2 to 114-N, the amplifier units 115-2 to 115-N, and the antennas 116-2 to 116-N will not be described here.

Furthermore, in a case where the wireless interface units 114-1 to 114-N do not need to be particularly discriminated from each other, the wireless interface units 114-1 to 114-N are referred to as wireless interface units 114. In a case where the amplifier units 115-1 to 115-N do not need to be particularly discriminated from each other, the amplifier units 115-1 to 115-N are referred to as amplifier units 115. In a case where the antennas 116-1 to 116-N do not need to be particularly discriminated from each other, the antennas 116-1 to 116-N are referred to as antennas 116.

Furthermore, the wireless interface units 114 may include (at least part of) at least one function of a function of the amplifier units 115 at a time of transmission or a function of the amplifier units 115 at a time of receipt. Furthermore, (at least part of) at least one function of a transmission function or a receipt function of the amplifier units 115 may be a component outside the communication unit 103. Moreover, the wireless interface units 114, the amplifier units 115, and the antennas 116 may be set as one set, and one or more sets may be included as components.

The power supply unit 104 includes a battery power supply or a fixed power supply, and supplies electric power to each of the units of the communication device 10.

The communication device 10 configured as described above is configured as the base stations AP or the terminal stations STA in the wireless communication system in FIG. 1, and the control unit 101 includes, for example, the following function to achieve communication that has high reliability and low delay. That is, the control unit 101 controls operations of each of the units to provide redundancy for transmission data transmitted by the base stations AP or the terminal stations STA (for example, performs repeated transmission on a frequency axis). The detail will be described later.

Incidentally, in recent years, reliability of wireless communication needs to be increased for ultra-high-quality-image transmission such as VR and AR, remote operation of precise machines, and the like. Especially in a wireless LAN technology that uses unlicensed frequency bands, interference from other systems occurs in addition to transmission attenuation. Therefore, it is more difficult to increase reliability of the transmission. As a countermeasure that increases reliability of transmission, there is a scheme in which the same frame (packet) is repeatedly transmitted on a time axis (hereinafter also referred to as the current scheme).

(Current Scheme)

Figure 3:
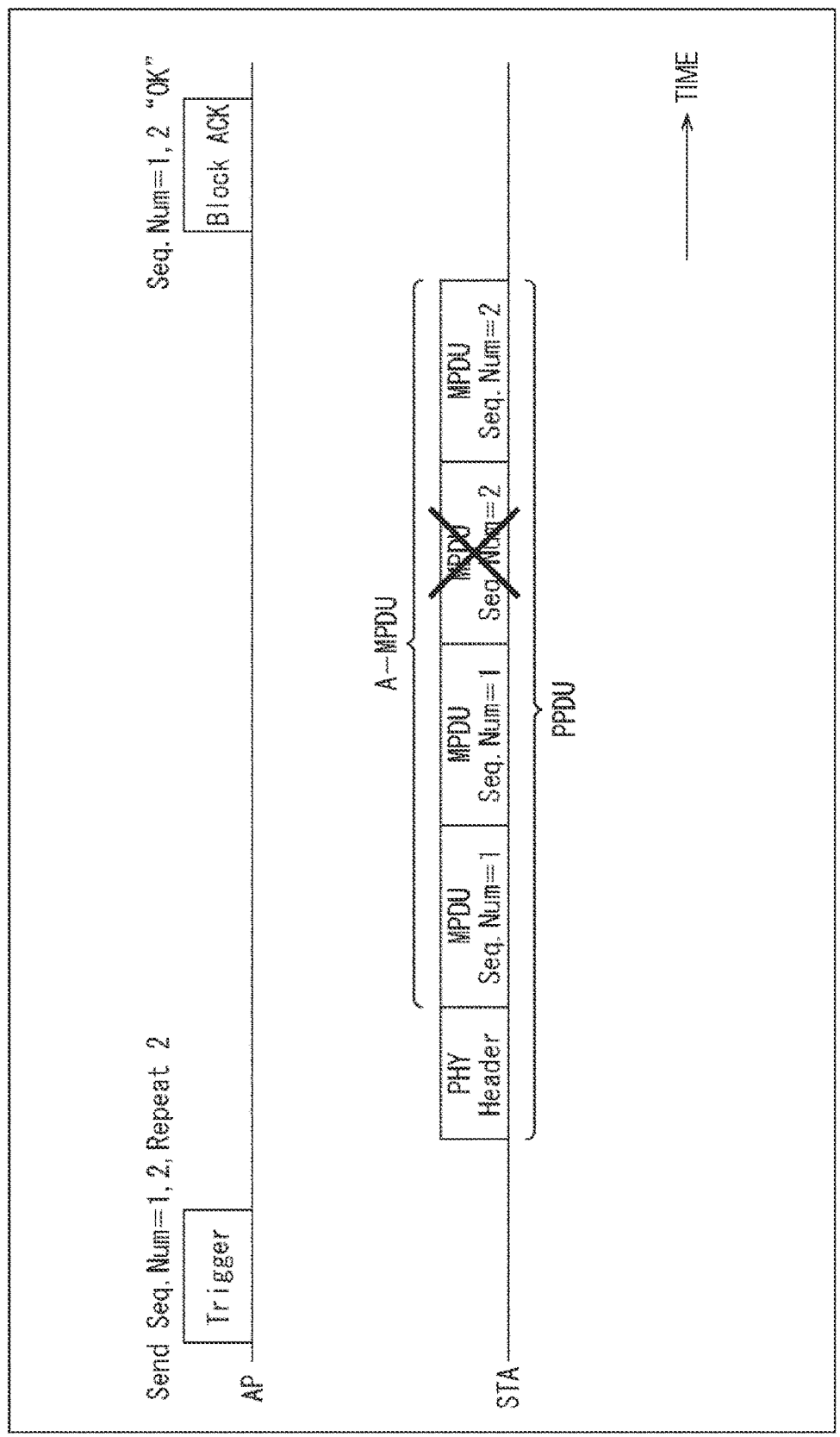
FIG. 3 is a diagram that schematically illustrates achievement of high reliability due to repeated transmission on a time axis due to a current scheme.

FIG. 3 is a diagram that schematically illustrates achievement of high reliability due to repeated transmission on a time axis.

In FIG. 3, a direction of time is from the left to the right in FIG. 3. Wireless communication is performed between a base station AP represented by an upper time series and a terminal station STA represented by a lower time series. In the wireless communication, a predetermined frequency band is used. Note that these relations similarly hold in FIGS. 4 to 7 that will be described later.

The base station AP transmits a trigger frame (Trigger) to the terminal station STA. The trigger frame contains information indicating a sequence number (Seq. Num) and the number of repetitions (Repeat) of a frame (packet) that should be transmitted.

The terminal station STA that has received the trigger frame transmitted from the base station AP transmits a frame (packet) the number of repetitions specified in the trigger frame. Here, each of Seq. Num=1, 2 and Repeat 2 is specified in the trigger frame. Therefore, the terminal station STA repeatedly transmits each of an MPDU #1 and an MPDU #2 of Seq. Num=1, 2 two times.

Since the same frame (packet) is repeatedly transmitted in this way, the terminal station STA fails to transmit a first MPDU #2 (an X mark in FIG. 3) but succeeds in transmitting a second MPDU #2 that follows the first MPDU #2 in FIG. 3, for example. Thus, the base station AP can receive each of the MPDU #1 and the MPDU #2, and therefore, the base station AP transmits an acknowledgement frame (Block ACK) for the receipt.

Note that a physical layer convergence protocol (PLCP) protocol data unit (PPDU) is a physical-layer frame (PHY frame), and has a structure in which a physical-layer header (PHY header) is added to a MAC protocol data unit aggregation (A-MPDU) containing a plurality of combined MPDUs. Furthermore, a MAC protocol data unit (MPDU) is a MAC-layer frame (MAC frame). Note that a frame that contains transmission data (for example, a PHY frame, a MAC frame, and the like) is also referred to as a first frame to discriminate the frame that contains transmission data from other frames.

As described above, a terminal station STA repeatedly transmits the same transmission data. Therefore, even if transmission of some transmission data fails, a base station AP can receive necessary transmission data if transmission of other transmission data that has been repeatedly transmitted succeeds, and consequently, reliability of transmission can be increased.

However, in such a current scheme, while reliability of transmission is increased, the same transmission data is repeatedly transmitted on a time axis. Therefore, delay occurs, and a need for low delay cannot be satisfied. Low delay is needed especially for applications used for ultra-high-quality-image transmission such as VR and AR, remote operation of precise machines, and the like. However, such a current scheme is far from the need for low delay.

Therefore, the present technology proposes a technology that can achieve communication that has high reliability and low delay in a wireless communication system such as a wireless LAN. Especially for the wireless LAN, a band is becoming wider due to allocation of new frequency bands (for example, a 6-GHz band) and the like, and thus high reliability and low delay are needed. The present technology can simultaneously satisfy the two needs for the high reliability and the low delay. Hereinafter, a new scheme to which the present technology is applied will be described in detail.

First Example of New Scheme

Figure 4:
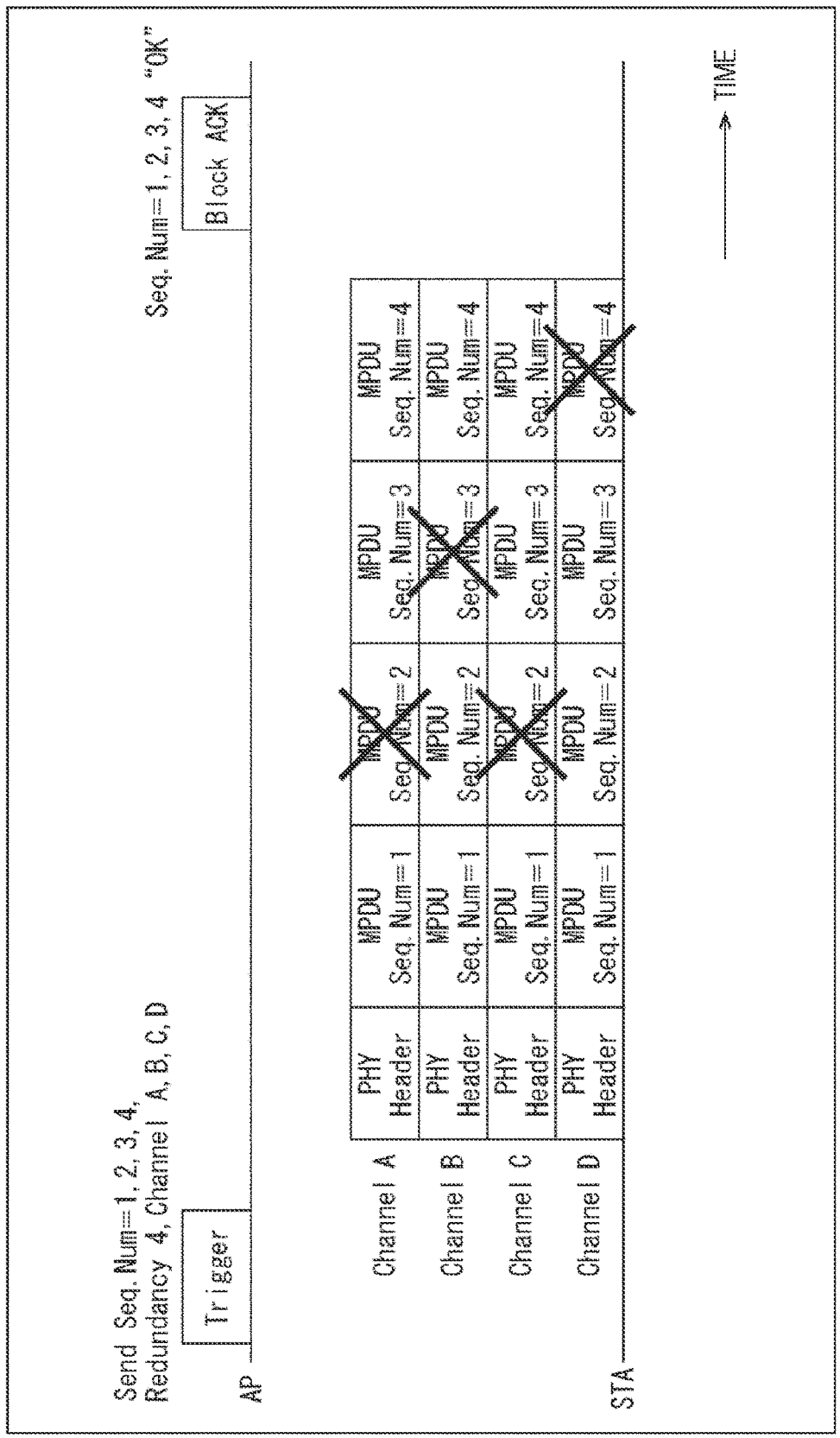
FIG. 4 is a diagram that schematically illustrates achievement of high reliability and low delay due to repeated transmission on a frequency axis due to a new scheme.

FIG. 4 is a diagram that schematically illustrates achievement of high reliability and low delay due to repeated transmission on a frequency axis. Note that uplink communication from a terminal station STA to a base station AP is supposed in FIGS. 4 to 7.

A base station AP transmits an extended trigger frame (Trigger) to a terminal station STA. The extended trigger frame contains information such as redundancy information (Redundancy), frequency information (Channel), and sequence information (Seq. Num).

Here, the redundancy information (Redundancy) is information regarding a provision of redundancy for transmission data transmitted by the terminal station STA or the base station AP. For example, the redundancy information includes information regarding the number of repetitions (Repeat), and the like. The number of repetitions can be determined on the basis of, for example, characteristics of the terminal station STA (for example, features of network traffic), a state of the terminal station STA (for example, a place where the terminal station STA is installed, and the like), or the like.

More specifically, for example, in a case where the terminal station STA is a precise machine, accurate communication is necessary. In such a case, the number of repetitions is increased compared with a usual case. Furthermore, for example, in a case where the terminal station STA is installed far from the base station AP, a transmission error is likely to occur. Therefore, the number of repetitions is increased compared with a usual case.

The frequency information (Channel) is information regarding frequency bands (frequency resource) used for a provision of redundancy. Note that since the frequency information is information used for frequency multiplexing, the frequency information may be also referred to as multiplexing information regarding multiplexing of transmission data. As a method of determining the frequency resource, for example, the base station AP observes communication states of other base stations AP around the base station AP (for example, used channels and the like), and can determine channels that are predicted to be available, as available channels.

More specifically, for example, the base station AP can determine Channels A, B, C, and D that are predicted to be available, as channels that are available for a long period of time, on the basis of a result of observation of communication states of other base stations AP around the base station AP. Furthermore, in a case of a short period of time, at every time at which redundancy is provided for transmission data (for example, the transmission data is repeatedly transmitted on a frequency axis), the base station AP allows more channels such as four channels (Channels A, B, C, and D) to be used in a case where an amount of the data is large, or allows fewer channels such as two channels (Channels A and B) to be used in a case where an amount of the data is small.

Furthermore, here, for example, in a case where the base station AP assigns four channels (Channels A, B, C, and D) as available channels to the terminal station STA, when the terminal station STA does not use some channel (for example, the Channel C) for communication, the channel (for example, the Channel C) may be excluded from the available channels. That is, here, it can be said that the base station AP makes available channels reflect an observation result on a terminal station STA side.

The sequence information (Seq. Num) contains a sequence number of a frame (packet). However, an extended trigger frame optionally contains the sequence information (sequence number).

Note that since an extended trigger frame is a trigger frame defined in IEEE 802.11ax and extended, the extended trigger frame is referred to as the extended trigger frame, here. Note that a structure of the extended trigger frame will be described later with reference to FIG. 9. Furthermore, the extended trigger frame is also referred to as a second frame to discriminate the extended trigger frame from other frames.

The terminal station STA receives an extended trigger frame transmitted from the base station AP, and multiplexes and transmits, on the basis of information contained in the extended trigger frame, a frame (packet) for which redundancy is provided.

In an example in FIG. 4, Seq. Num=1, 2, 3, and 4, Redundancy 4, and Channels A, B, C, and D are each specified as information contained in the extended trigger frame. Therefore, the terminal station STA transmits a PHY frame with the redundancy (Redundancy 4) specified with the redundancy information, that is, the number of repetitions (Repeat 4), for every channel (Channels A, B, C, and D) specified with the frequency information.

Therefore, the terminal station STA uses the Channel A to sequentially transmit an MPDU #1 (MPDU of Seq. Num=1), an MPDU #2 (MPDU of Seq. Num=2), an MPDU #3 (MPDU of Seq. Num=3), and an MPDU #4 (MPDU of Seq. Num=4). Furthermore, the MPDU #1, the MPDU #2, the MPDU #3, and the MPDU #4 are sequentially transmitted through the Channels B, C, and D, similarly to the Channel A.

That is, the terminal station STA sequentially transmits the MPDU #1, the MPDU #2, the MPDU #3, and the MPDU #4 through each of frequency bands that correspond to the four channels (Channels A, B, C, and D) (for example, channel frequencies of a bandwidth of 20 MHz). In other words, it can be said that the terminal station STA repeatedly transmits a PHY frame that contains the MPDU #1 to the MPDU #4 four times, on a frequency axis, on the basis of redundancy information (the number of repetitions) and multiplexing information (frequency information) that are contained in an extended trigger frame (simultaneously (multiplexes and) transmits PHY frames #1 to #4 through different frequency bands).

Repeated transmission is performed on a frequency axis in this way. Therefore, when the terminal station STA repeatedly transmits the MPDU #2 stored in a PHY frame, even if, for example, transmission of the MPDU #2 fails through the two Channels A and C of the four Channels A, B, C, and D (X marks in FIG. 4), the base station AP can receive the MPDU #2 since transmission of the MPDU #2 succeeds through the two remaining Channels B and D.

Furthermore, in FIG. 4, when the terminal station STA repeatedly transmits the MPDU #3 stored in a PHY frame, on a frequency axis, even if, for example, transmission of the MPDU #3 through the one Channel B of the four Channels A, B, C, and D fails (an X mark in FIG. 4), the base station AP can receive the MPDU #3 since transmission of the MPDU #3 succeeds through the three remaining Channels A, C, and D.

Moreover, in FIG. 4, when the terminal station STA repeatedly transmits the MPDU #4 stored in a PHY frame, on a frequency axis, even if, for example, transmission of the MPDU #4 through the one Channel D of the four Channels A, B, C, and D fails (an X mark in FIG. 4), the base station AP can receive the MPDU #4 since transmission of the MPDU #4 succeeds through the three remaining Channels A, B, and C.

Note that since transmission of the MPDU #1 succeeds through the all Channels A, B, C, and D, the base station AP can receive the MPDU #1 through communication using any of the channel frequencies.

Furthermore, when the base station AP as a receipt station receives PHY frames transmitted through every channel (Channels A, B, C, and D) from the terminal station STA as a transmission station, the base station AP performs, for example, processes as follows: That is, the base station AP can receive PHY frames through respective channels (Channels A, B, C, and D), separately, remove errors, and transfer, to a protocol upper layer, transmission data that has been normally received, or the base station AP can synthesize signals received through every channel (Channels A, B, C, and D), and apply signal processing (for example, adds together electric power of signals received through every channel, and thus obtains larger electric power, and then attempts decoding).

In this way, in the new scheme, a terminal station STA repeatedly transmits a PHY frame that contains transmission data, on a frequency axis, on the basis of redundancy information (the number of repetitions) and multiplexing information (frequency information) that are contained in an extended trigger frame. Consequently, even if transmission of part of the frame (packet) fails, transmission can succeed as a whole. Therefore, an error ratio can be decreased and reliability can be increased. Furthermore, in the new scheme, repeated transmission on a time axis as in the current scheme is not performed but repeated transmission on a frequency axis is performed. Therefore, delay on a time axis can be decreased, and a need for low delay can be simultaneously satisfied.

Here, since unlicensed frequency bands are used for a wireless LAN system, for example, burst interference from other wireless LAN systems, other networks (BSSs), or the like may occur. For example, in FIG. 5, of four Channels A, B, C, and D that are intended to be used according to an extended trigger frame, other wireless LAN systems cause interference in some channels (Channels B and C) ("Interference" in FIG. 5). Therefore, a terminal station STA determines that the Channels B and C where interference occurs cannot be used.

In such a case where interference occurs in the Channels B and C, PHY frames can be transmitted through the remaining channels A and D according to the new scheme. For example, in FIG. 5, the terminal station STA sequentially transmits an MPDU #1, an MPDU #2, an MPDU #3, and an MPDU #4 through each of frequency bands (channel frequencies) that correspond to the remaining Channels A and D where interference does not occur (a PHY frame that contains the MPDU #1 to the MPDU #4 is repeatedly transmitted on a frequency axis two times).

Figure 5:
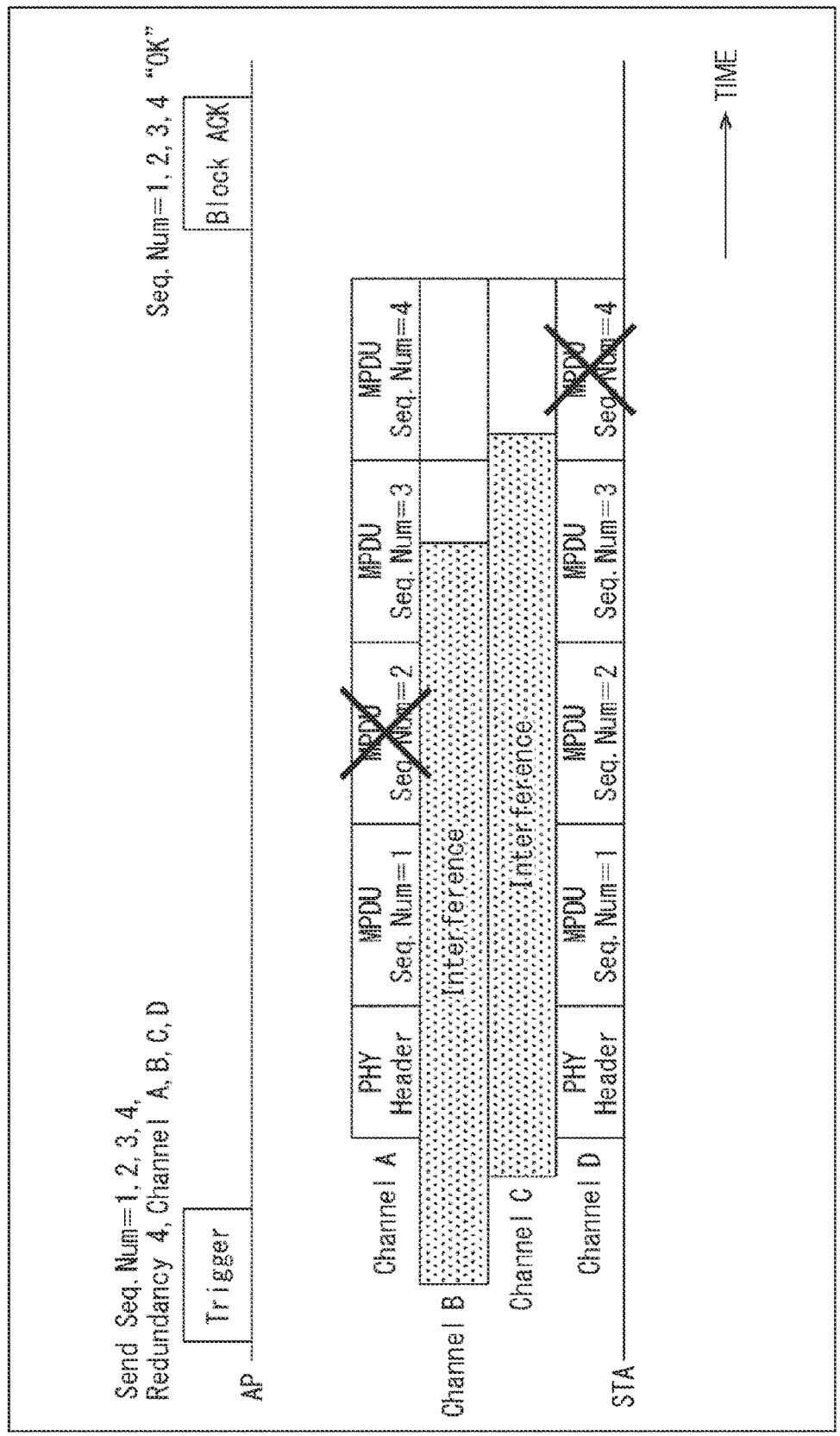
FIG. 5 is a diagram that schematically illustrates an interference avoidance effect due to the new scheme.

Furthermore, in FIG. 5, when the terminal station STA repeatedly transmits the MPDU #2 stored in a PHY frame, on a frequency axis, transmission of the MPDU #2 through the Channel A, for example, fails (an X mark in FIG. 5). However, a base station AP can receive the MPDU #2 since transmission of the MPDU #2 through the other Channel D succeeds.

Moreover, in FIG. 5, when the terminal station STA repeatedly transmits the MPDU #4 stored in a PHY frame, on a frequency axis, transmission of the MPDU #4 through the Channel D, for example, fails (an X mark in FIG. 5). However, the base station AP can receive the MPDU #4 since transmission of the MPDU #4 through the other Channel A succeeds.

As described above, the new scheme can simultaneously satisfy two needs for high reliability and low delay in a wireless communication system. Especially in a wireless LAN system, burst interference from other wireless LAN systems, other networks (BSSs), or the like occurs. However, usage of the new scheme can avoid such interference, and allows transmission data to be surely transmitted. Furthermore, here, available channels are efficiently used, and delay can be lowered.

Second Example of New Scheme

Figure 6:
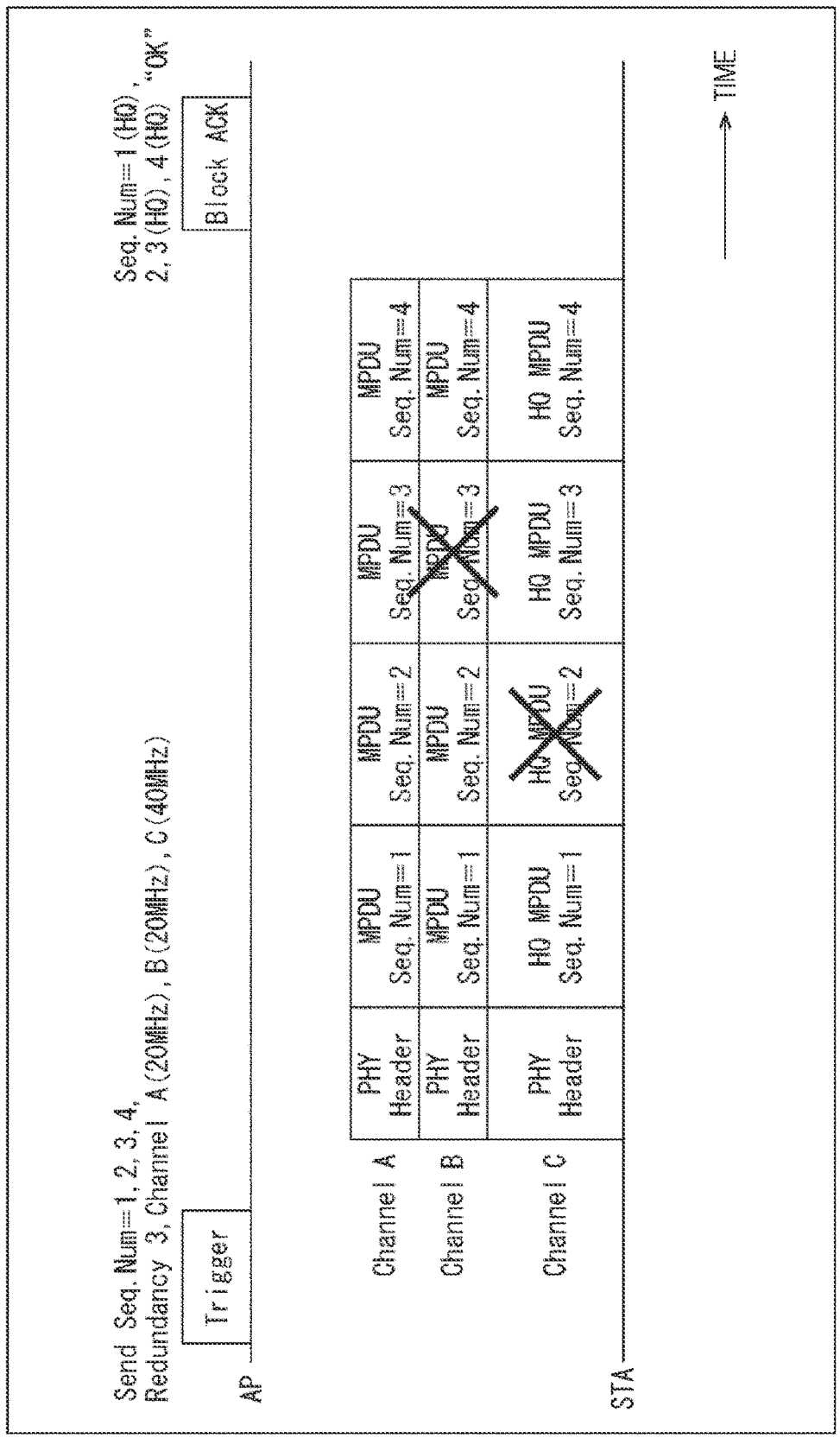
FIG. 6 is a diagram that schematically illustrates an example of a case where different bandwidths are allocated due to the new scheme.

FIG. 6 is a diagram that schematically illustrates an example of a case where different bandwidths are allocated.

In FIG. 6, a base station AP transmits an extended trigger frame to a terminal station STA. The extended trigger frame contains information such as redundancy information (Redundancy), frequency information (Channel), and sequence information (Seq. Num).

In an example in FIG. 6, Seq. Num=1, 2, 3, and 4, Redundancy 3, and Channels A (20 MHz), B (20 MHz), and C (40 MHz) are each specified as information contained in the extended trigger frame. However, a number (unit: MHz) in parentheses written for each of the channels represents a bandwidth of the channel.

That is, of the three Channels A, B, and C, bandwidths of the Channel A and the Channel B are 20 MHz, but a bandwidth of the Channel C is 40 MHz, which is wider than the bandwidths of the Channel A and the Channel B. Therefore, the terminal station STA can selectively use the channels of narrower bands (Channels A and B) and the channel of a wider band (Channel C) according to characteristics of transmission data (for example, compression ratios of transmission data).

For example, the terminal station STA that has received an extended trigger frame performs processes (for example, encoding and the like) to a single data stream, and generates transmission data to which compression ratios that correspond to bandwidths (for example, 20 MHz, 40 MHz, and the like) specified with frequency information has been applied. Then, of generated transmission data, the terminal station STA transmits a PHY frame in which transmission data that corresponds to lower compression is stored, through the Channel C of a wider band (bandwidth: 40 MHz), and transmits a PHY frame in which transmission data that corresponds to higher compression is stored, through the Channels A and B of narrower bands (bandwidth: 20 MHz).

That is, the terminal station STA multiplexes (frequency multiplexing) and transmits transmission data compressed by compression ratios that correspond to bandwidths (transmission data for which redundancy is provided) to the base station AP using channels of different bandwidths, on the basis of information (redundancy information and frequency information) contained in an extended trigger frame.

Therefore, the terminal station STA uses the Channel A of a narrower band (bandwidth: 20 MHz) to sequentially transmit an MPDU #1, an MPDU #2, an MPDU #3, and an MPDU #4. Furthermore, the MPDU #1, the MPDU #2, the MPDU #3, and the MPDU #4 are sequentially transmitted through the Channel B (bandwidth: 20 MHz), similarly to the Channel A (bandwidth: 20 MHz).

On the other hand, the terminal station STA uses the channel C of a wider band (bandwidth: 40 MHz) to sequentially transmit a HQ MPDU #1, a HQ MPDU #2, a HQ MPDU #3, and a HQ MPDU #4. Note that in FIG. 6, an MPDU in which transmission data that corresponds to lower compression (for example, data of ultra-high-quality images and the like) is stored is written as a High Quality MPDU (HQ MPDU) to discriminate the HQ MPDU from an MPDU in which transmission data that corresponds to higher compression (for example, data of standard-quality images and the like) is stored.

In this way, when the terminal station STA provides redundancy on a frequency axis for a PHY frame that contains transmission data, and transmits the PHY frame, on the basis of information contained in an extended trigger frame, the terminal station STA uses channels of different bandwidths (a wider band and a narrower band) that correspond to compression ratios of transmission data, to perform the transmission. Then, the base station AP that receives transmission data from the terminal station STA gives priority to receiving HQ MPDUs transmitted through the Channel C of a wider band (bandwidth: 40 MHz), and receives MPDUs transmitted through the Channels A and B of narrower bands (bandwidth: 20 MHz) only in a case where receipt of HQ MPDUs fails.

For example, when in FIG. 6, the terminal station STA transmits PHY frames #1 and #2 through the Channels A and B of narrower bands (bandwidth: 20 MHz), respectively, and transmits a PHY frame #3 through the Channel C of a wider band (bandwidth: 40 MHz), the base station AP gives priority to receiving a HQ MPDU #1 since transmission of MPDUs #1 contained in the PHY frames #1 and #2 and transmission of the HQ MPDU #1 contained in the PHY frame #3 both succeed. To the contrary, transmission of a HQ MPDU #2 contained in the PHY frame #3 fails. Therefore, the base station AP receives HQ MPDUs #1 contained in the PHY frames #1 and #2 instead of the HQ MPDU #2.

Next, in FIG. 6, although transmission of an MPDU #3 contained in the PHY frame #2 fails, transmission of a HQ MPDU #3 contained in the PHY frame #3 succeeds. Therefore, the base station AP gives priority to receiving the HQ MPDU #3. Thereafter, in FIG. 6, transmission of MPDUs #4 contained in the PHY frames #1 and #2, and transmission of a HQ MPDU #4 contained in the PHY frame #3 both succeed. Therefore, the base station AP gives priority to receiving the HQ MPDU #4.

In this way, the base station AP selectively and adaptively receives transmission data (a HQ MPDU) that corresponds to lower compression and transmission data (an MPDU) that corresponds to higher compression, according to a state in which transmission data is received.

As described above, the new scheme simultaneously satisfies two needs for high reliability and low delay in a wireless communication system. Furthermore, the new scheme allows different bandwidths (for example, 20 MHz, 40 MHz, and the like) to be allocated to every channel when redundancy on a frequency axis is provided and transmission is performed. Consequently, for example, PHY frames in which transmission data that corresponds to lower compression is stored can be transmitted through a channel of a wider band, and PHY frames in which transmission data that corresponds to higher compression is stored can be transmitted through a channel of a narrower band. Therefore, transmission and the like of ultra-high-quality images can be performed without delay.

Note that a case where there are two kinds of bandwidths of channels, 20 MHz and 40 MHz, has been described in the description in the second example, but other bandwidths such as 60 MHz and 120 MHz may be used. Furthermore, other bands such as a middle band may be allocated as a band between a channel of a wider band and a channel of a narrower band, using three or more kinds of bandwidths.

Third Example of New Scheme

Figure 7:
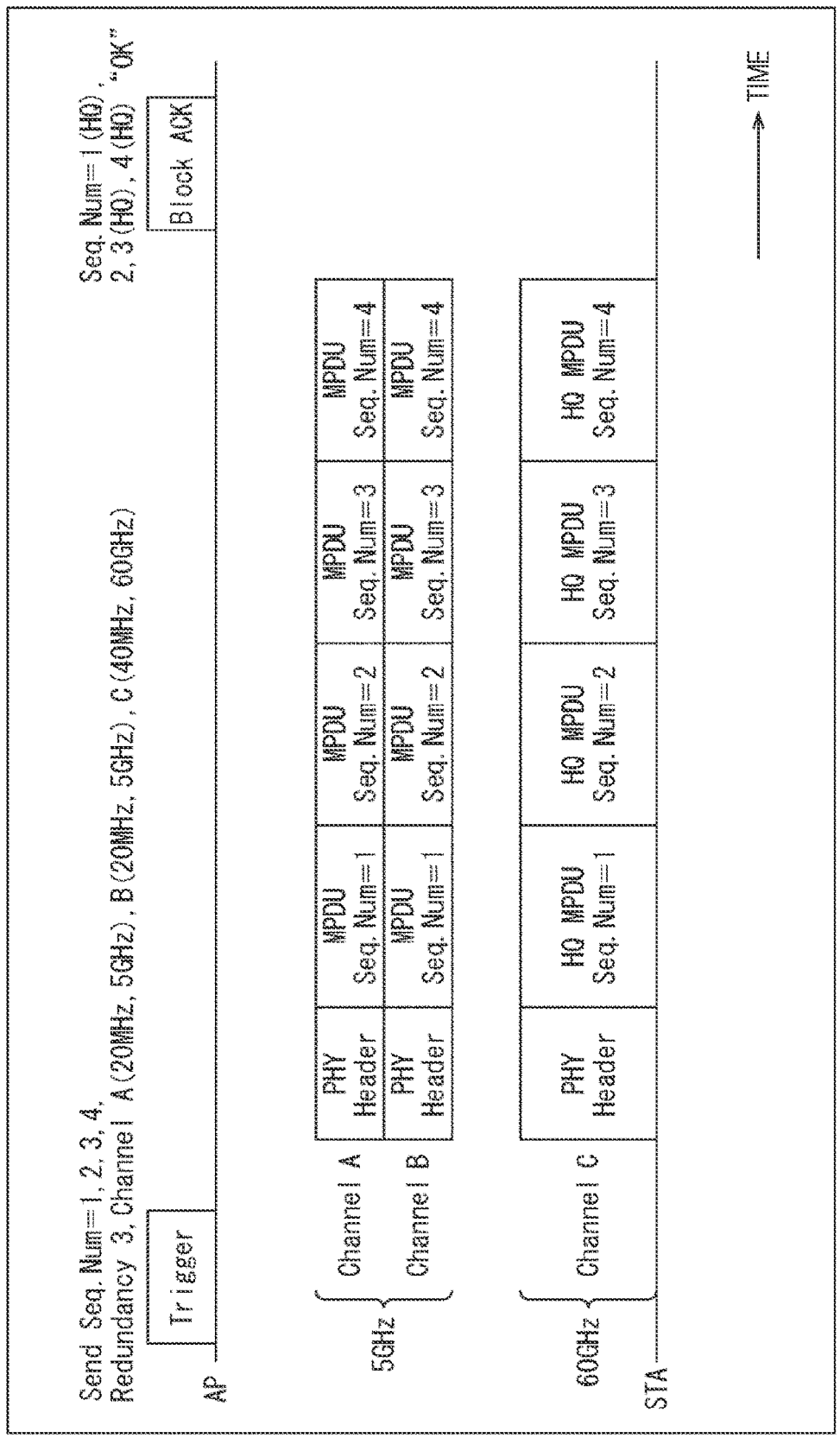
FIG. 7 is a diagram that schematically illustrates an example of a case where different frequency bands are used due to the new scheme.

FIG. 7 is a diagram that schematically illustrates an example of a case where different frequency bands are used.

In FIG. 7, a base station AP transmits an extended trigger frame to a terminal station STA. The extended trigger frame contains redundancy information (Redundancy), frequency information (Channel), and sequence information (Seq. Num).

In the example in FIG. 7, Seq. Num=1, 2, 3, and 4, Redundancy 3, and Channels A (20 MHz, 5 GHz), B (20 MHz, 5 GHz), and C (40 MHz, 60 GHz) are each specified as information contained in the extended trigger frame. However, of the two numbers in the parentheses written for each of the channels (units: MHz and GHz), the former represents a bandwidth, and the latter represents an available frequency band (usage frequency band).

That is, of the three Channels A, B, and C, usage frequency bands of the Channel A and the Channel B are a 5-GHz band, while a usage frequency band of the Channel C is a 60-GHz band, and the available frequency bands are different from each other. Furthermore, bandwidths of the Channel A and the Channel B are 20 MHz, while a bandwidth of the Channel C is 40 MHz, and the bandwidths are also different from each other.

In the third example, the terminal station STA transmits PHY frames in which transmission data that corresponds to lower compression is stored, through the Channel C of a wider band (bandwidth: 40 MHz), and transmits PHY frames in which transmission data that corresponds to higher compression is stored, through the Channels A and B of narrower bands (bandwidth: 20 MHz), similarly to the second example described above. In the third example, however, the Channel C of a wider band (bandwidth: 40 MHz) is a 60-GHz band, while the Channels A and B of narrower bands (bandwidth: 20 MHz) is a 5-GHz band, and the available frequency bands are different from each other.

Therefore, the terminal station STA uses the Channel A of the 5-GHz band (bandwidth: 20 MHz) to sequentially transmit an MPDU #1, an MPDU #2, an MPDU #3, and an MPDU #4. Furthermore, the MPDU #1, the MPDU #2, the MPDU #3, and the MPDU #4 are sequentially transmitted through the Channel B of the 5-GHz band (bandwidth: 20 MHz), similarly to the Channel A of the 5-GHz band (bandwidth: 20 MHz). On the other hand, the terminal station STA uses the Channel C of the 60-GHz band (bandwidth: 40 MHz) to sequentially transmit a HQ MPDU #1, a HQ MPDU #2, a HQ MPDU #3, and a HQ MPDU #4.

In this way, when the terminal station STA provides redundancy on a frequency axis for a PHY frame that contains transmission data, and transmits the PHY frame, on the basis of information contained in an extended trigger frame, the terminal station STA uses different bandwidths (20 MHz or 40 MHz) that correspond to compression ratios of transmission data, and uses different usage frequency bands (the 5-GHz band or the 60-GHz band), to perform the transmission. Furthermore, in the third example similarly to the second example described above, the base station AP gives priority to receiving HQ MPDUs transmitted through the Channel C of the 60-GHz band (bandwidth: 40 MHz). The base station AP can receive MPDUs transmitted through the Channels A and B of the 5-GHz band (bandwidth: 20 MHz) only in a case where receipt of HQ MPDUs fails.

As described above, the new scheme can simultaneously satisfy two needs for high reliability and low delay in a wireless communication system. Furthermore, the new scheme allows different usage frequency bands (for example, a 5-GHz band, a 60-GHz band, and the like) to be used when different bandwidths (for example, 20 MHz, 40 MHz, and the like) are allocated to every channel when redundancy on a frequency axis is provided and transmission is performed. Consequently, for example, PHY frames in which transmission data that corresponds to lower compression is stored can be transmitted through a channel of a wider band, and PHY frames in which transmission data that corresponds to higher compression is stored can be transmitted through a channel of a narrower band. Therefore, transmission of ultra-high-quality images can be performed without delay.

Note that in the third example of the new scheme, when different usage frequency bands (for example, a 5-GHz band, a 60-GHz band, and the like) are used, preferably, transmission of PHY frames through respective bands is synchronized, considering low delay. However, (transmission data contained in) PHY frames transmitted through each of bands do not necessarily need to be synchronized.

Furthermore, a case where there are two kinds of the usage frequency bands, the 5-GHz band and the 60-GHz band, has been described in the description in the third example, but other usage frequency bands such as new frequency bands (for example, a 6-GHz band) may be used. Furthermore, three or more kinds of usage frequency bands may be used. Moreover, a case where there are two kinds of bandwidths of channels, 20 MHz and 40 MHz, has been described in the description in the third example, similarly to the second example described above, but other bandwidths may be used. Furthermore, other bands may be allocated using three or more kinds of bandwidths.

Fourth Example of New Scheme

Cases where uplink communication from a terminal station STA to a base station AP is supposed have been described above in the descriptions of FIGS. 4 to 7. However, a new scheme to which the present technology is applied may be used for, for example, downlink communication from a base station AP to a terminal station STA, communication that a terminal station STA performs without an instruction from a base station AP, and the like.

Figure 8:
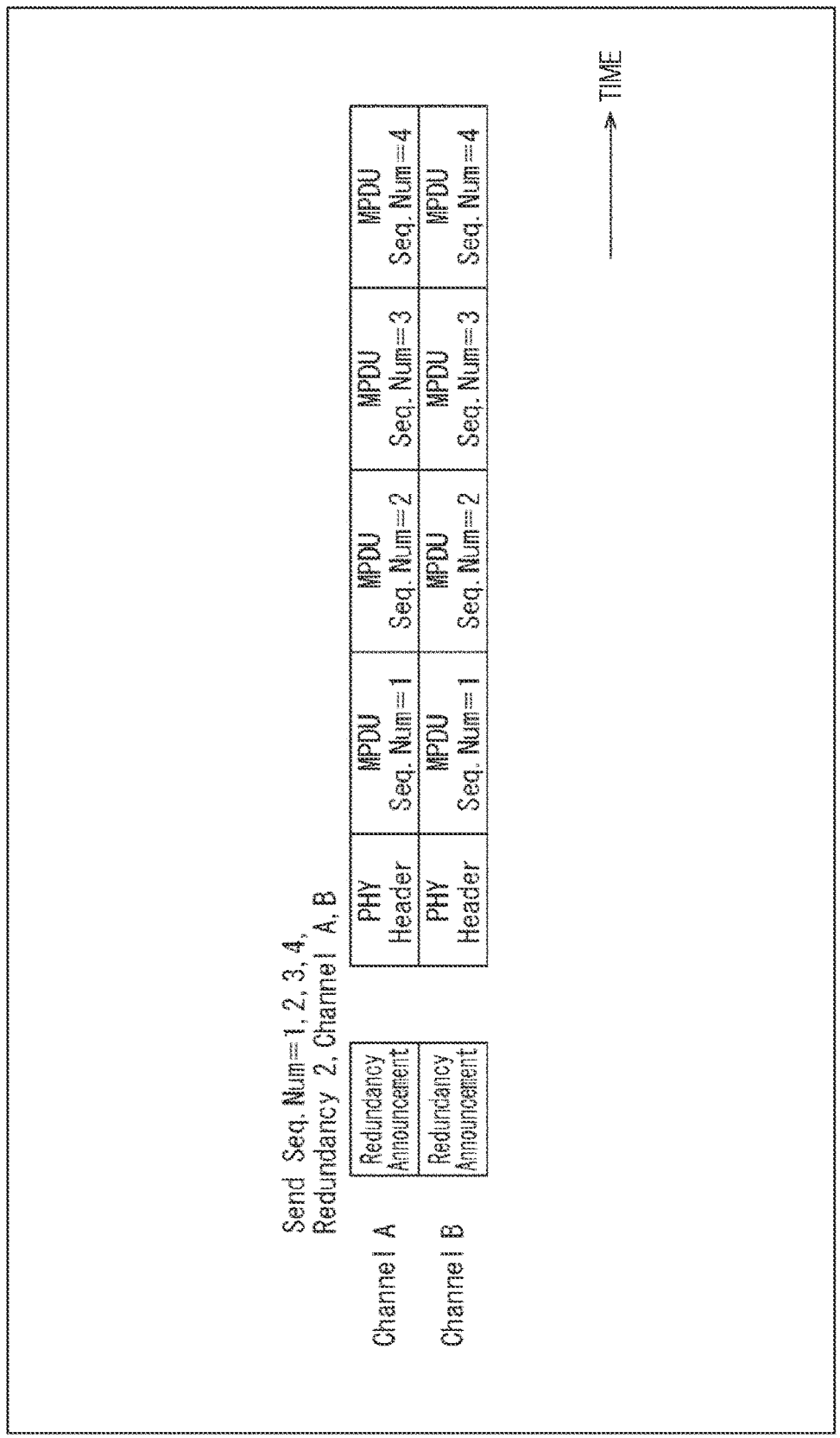
FIG. 8 is a diagram that schematically illustrates an example of a case where repeated transmission is performed on a frequency axis at a time of downlink communication, due to the new scheme.

FIG. 8 is a diagram that schematically illustrates an example of a case where repeated transmission is performed on a frequency axis at a time of downlink communication.

In FIG. 8, in a case where repeated transmission is performed on a frequency axis, a base station AP notifies (announces) a terminal station STA beforehand of a fact that the repeated transmission will be performed. The beforehand announcement frame (redundancy announcement frame) contains at least multiplexing information such as redundancy information (Redundancy) and frequency information (Channel), similarly to the extended trigger frame described above. Note that the beforehand announcement frame may contain sequence information (Seq. Num), similarly to the extended trigger frame.

In the example in FIG. 8, Seq. Num=1, 2, 3, and 4, Redundancy 2, and Channels A and B are each specified as information contained in the beforehand announcement frame. That is, it can be said that the base station AP as a transmission station transmits a beforehand announcement frame to announce, to the terminal station STA as a receipt station beforehand, a scheme of communication that will be performed (for example, channels through which the transmission will be performed, the number of times that the transmission will be repeated, and the like).

The base station AP that has provided a notification of the beforehand announcement frame sequentially transmits an MPDU #1, an MPDU #2, an MPDU #3, and an MPDU #4 through each of frequency bands (channel frequencies) that correspond to the two channels (Channels A and B) according to information a notification of which has been provided by means of the frame beforehand. In other words, it can be said that the base station AP repeatedly transmits a PHY frame that contains the MPDU #1 to the MPDU #4 two times, on a frequency axis, (PHY frames #1 and #2 are simultaneously transmitted through different frequency bands), on the basis of redundancy information and frequency information a notification of which has been provided by means of the beforehand announcement frame.

In this way, the base station AP notifies the terminal station STA of the beforehand announcement frame. Therefore, also in a case where downlink communication from the base station AP to the terminal station STA is performed, repeated transmission on a frequency axis can be performed. Therefore, reliability is increased, and a need for low delay can be satisfied.

Note that also in such a case where repeated transmission is performed on a frequency axis at a time of downlink communication, as illustrated in FIG. 8, different bandwidths (for example, 20 MHz, 40 MHz, and the like) may be allocated to every channel (the second example in FIG. 6), and different usage frequency bands (for example, a 5-GHz band, a 60-GHz band, and the like) may be used for every channel (the third example in FIG. 7), similarly to the uplink communication described above. In such cases, frequency information contained in a beforehand announcement frame includes, for example, information indicating bandwidths and usage frequency bands, in addition to information indicating channels.

Furthermore, although a structure of the beforehand announcement frame will be described later with reference to FIG. 9, redundancy information, frequency information, and number information that are contained in a beforehand announcement frame may be stored in a PHY header of a PHY frame repeatedly transmitted on a frequency axis. In this case, a notification of the beforehand announcement frame is not necessary. Note that the beforehand announcement frame is also referred to as a third frame to discriminate the beforehand announcement frame from other frames.

Furthermore, in a case of communication (uplink communication) performed by a terminal station STA without an instruction from a base station AP, the terminal station STA notifies the base station AP of a beforehand announcement frame, and then transmits a PHY frame that contains transmission data. Note that also in this case, information such as redundancy information and frequency information may be stored in a PHY header.

Fifth Example of New Scheme

Although cases where repeated transmission is performed on a frequency axis have been described above as an example of provisions of redundancy, the new scheme is not limited to the repeated transmission on a frequency axis. In the new scheme, redundancy may be provided on, for example, a spatial axis or a time axis.

More specifically, in a case where multiple-input multiple-output (MIMO), for example, is used as a scheme of communication between a base station AP and a terminal station STA, both the base station AP and the terminal station STA use a plurality of antennas to simultaneously transmit signals. By using these antennas, redundancy can be provided on a spatial axis. That is, here, the same transmission data (or transmission data that has different compression ratios) is transmitted or received through separate antennas. Redundancy is provided on a spatial (antenna) axis.

In such a case where redundancy is provided on a spatial axis, it is only required that an extended trigger frame and a beforehand announcement frame contain information regarding the number of repetitions on a spatial (antenna) axis, as redundancy information, instead of the number of repetitions on a frequency axis. Furthermore, multiplexing information includes information (spatial information) regarding a spatial stream (SS), instead of frequency information. Note that structures of an extended trigger frame and a beforehand announcement frame in a case where redundancy is provided on a spatial axis will be described later with reference to FIGS. 9 and 10, respectively.

(Structure of Extended Trigger Frame)

Figure 9:
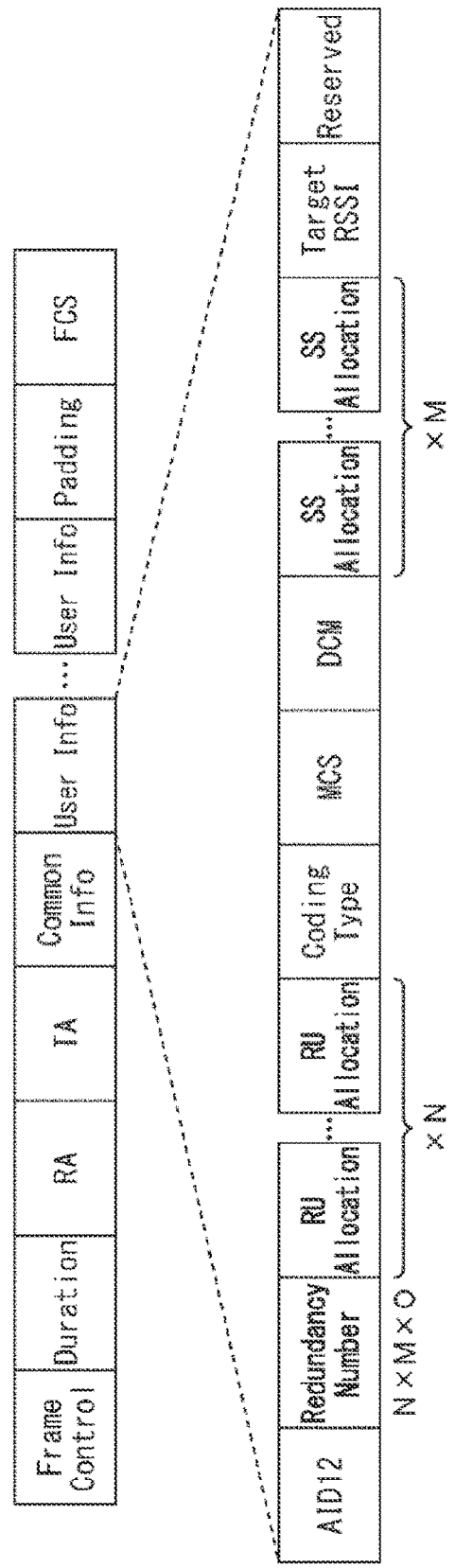
FIG. 9 is a diagram that illustrates an example of formats of an extended trigger frame.

FIG. 9 is a diagram that illustrates an example of formats of an extended trigger frame. Note that the extended trigger frame is a trigger frame defined in IEEE 802.11ax and extended.

In FIG. 9, the extended trigger frame includes Frame Control, Duration, RA, TA, Common Info, User Info, Padding, and FCS.

Information regarding the type of the frame is stored in the Frame Control. Information regarding a length of the frame is stored in the Duration. Information regarding an address of a transmission destination of the frame is stored in the receiver address (RA). Information regarding an address of a transmitter of the frame is stored in the transmitter address (TA).

The Common Info is a field in which common information is stored. The User Info is a field in which information on each of users is stored. The Padding represents padding that adjusts a frame length. Information regarding error detection and correction is stored in the frame check sequence (FCS).

Here, in the extended trigger frame, a field of User Info of a trigger frame is extended to store information such as redundancy information and multiplexing information. The User Info includes AID12, Redundancy Number, RU Allocation, Coding Type, MCS, DCM, SS Allocation, Target RSSI, and Reserved.

Information regarding the number of repetitions as redundancy is stored in the Redundancy Number. For example, in the first to third examples of the new scheme that have been described above (FIGS. 4 to 7), information regarding the number (N) of repetitions on a frequency axis is stored in the Redundancy Number to perform repeated transmission on a frequency axis at a time of uplink communication. Furthermore, according to the number (N) of repetitions on a frequency axis stored in the Redundancy Number, N resource unit (RU) Allocation fields are added in a field of the User Info, and frequency information is stored in the N RU Allocation fields.

Furthermore, for example, in the fifth example of the new scheme that has been described above, not only repeated transmission on a frequency axis but also repeated transmission on a spatial (antenna) axis or a time axis is performed. Therefore, information regarding the number (M) of repetitions on a spatial axis, or the number (O) of repetitions on a time axis can be stored in the Redundancy Number. Furthermore, in a field of the User Info, the number (M) of repetitions on a spatial axis stored in the Redundancy Number, that is, M spatial stream (SS) Allocation fields according to the number of antennas are added, and spatial information is stored in the M SS Allocation fields.

Note that although cases where redundancy is provided on a frequency axis, a spatial axis, or a time axis (repeated transmission) have been described here, the provisions of redundancy may be performed independently, or the plurality of provisions of redundancy may be performed simultaneously in combination. For example, in a case where provisions of redundancy on a frequency axis, a spatial axis, and a time axis (repeated transmission) are simultaneously performed, information regarding the number (N) of repetitions on a frequency axis, the number (M) of repetitions on a spatial axis, and the number (O) of repetitions on a time axis is each stored in Redundancy Number.

(Structure of Beforehand Announcement Frame)

Figure 10:
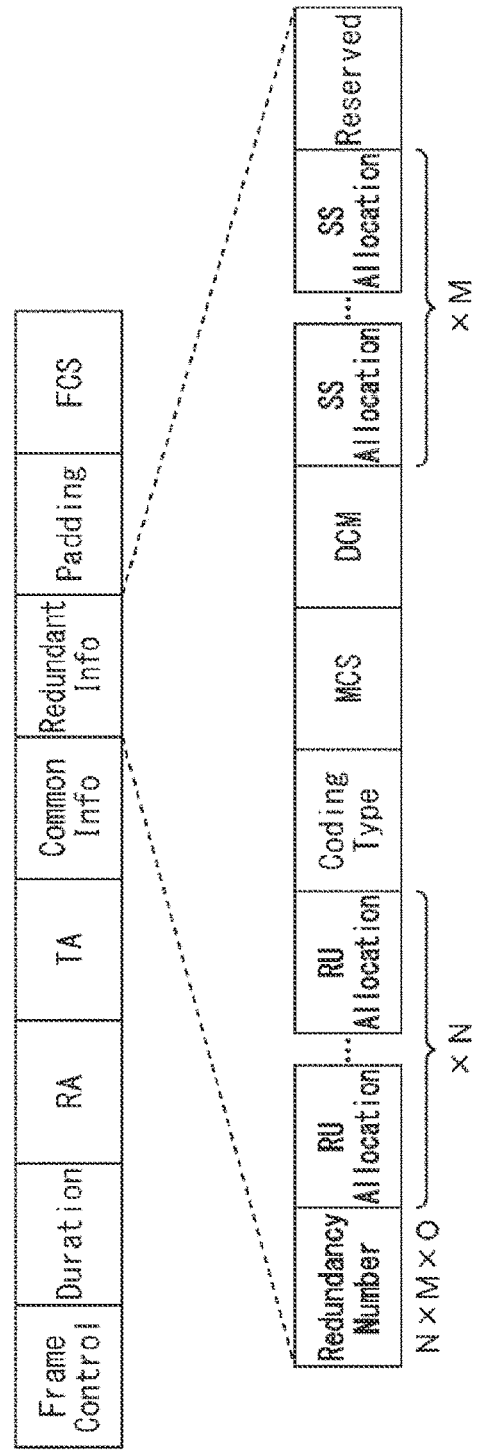
FIG. 10 is a diagram that illustrates an example of formats of a beforehand announcement frame.

FIG. 10 is a diagram that illustrates an example of formats of a beforehand announcement frame.

In FIG. 10, the beforehand announcement frame includes Frame Control, Duration, RA, TA, Common Info, Redundant Info, Padding, and FCS. The Redundant Info includes Redundancy Number, RU Allocation, Coding Type, MCS, DCM, SS Allocation, and Reserved.

Information regarding the number of repetitions as redundancy is stored in the Redundancy Number. For example, in the fourth example (FIG. 8) of the new scheme that has been described above, information regarding the number (N) of repetitions on a frequency axis is stored in the Redundancy Number, and frequency information is stored in N resource unit (RU) Allocation fields to perform repeated transmission on a frequency axis at a time of downlink communication.

Furthermore, for example, in the fourth example (FIG. 8) of the new scheme that has been described above, not only repeated transmission on a frequency axis but also repeated transmission on a spatial (antenna) axis or a time axis can be performed. Therefore, information regarding the number (M) of repetitions on a spatial axis, or the number (O) of repetitions on a time axis can be stored in the Redundancy Number. Furthermore, according to the number (M) of repetitions on a spatial axis stored in the Redundancy Number, spatial information is stored in M SS Allocation fields.

In this way, the beforehand announcement frame (FIG. 10) can basically have a configuration similar to a configuration of the extended trigger frame (FIG. 9). In a case of the extended trigger frame (FIG. 9), it is expected that the extended trigger frame (FIG. 9) may cause transmission from a plurality of terminal stations STA. On the other hand, in a case of the beforehand announcement frame (FIG. 10), one device (base station AP) performs transmission after the beforehand announcement frame (FIG. 10). Therefore, information such as ID information and transmission power control (Target RSSI) can be eliminated.

Furthermore, in a case where a notification with a beforehand announcement frame is not performed, and information such as redundancy information and multiplexing information (for example, frequency information and spatial information) is included in a PHY header of a PHY frame, as described above, it is only required that information that corresponds to information stored in a field of Redundant Info illustrated in FIG. 10 is stored in the PHY header.

(Series of Processes Between Base Station and Terminal Station)

Next, a series of processes between a base station AP and a terminal station STA will be described with reference to flowcharts of FIGS. 11 and 12.

Figure 11:
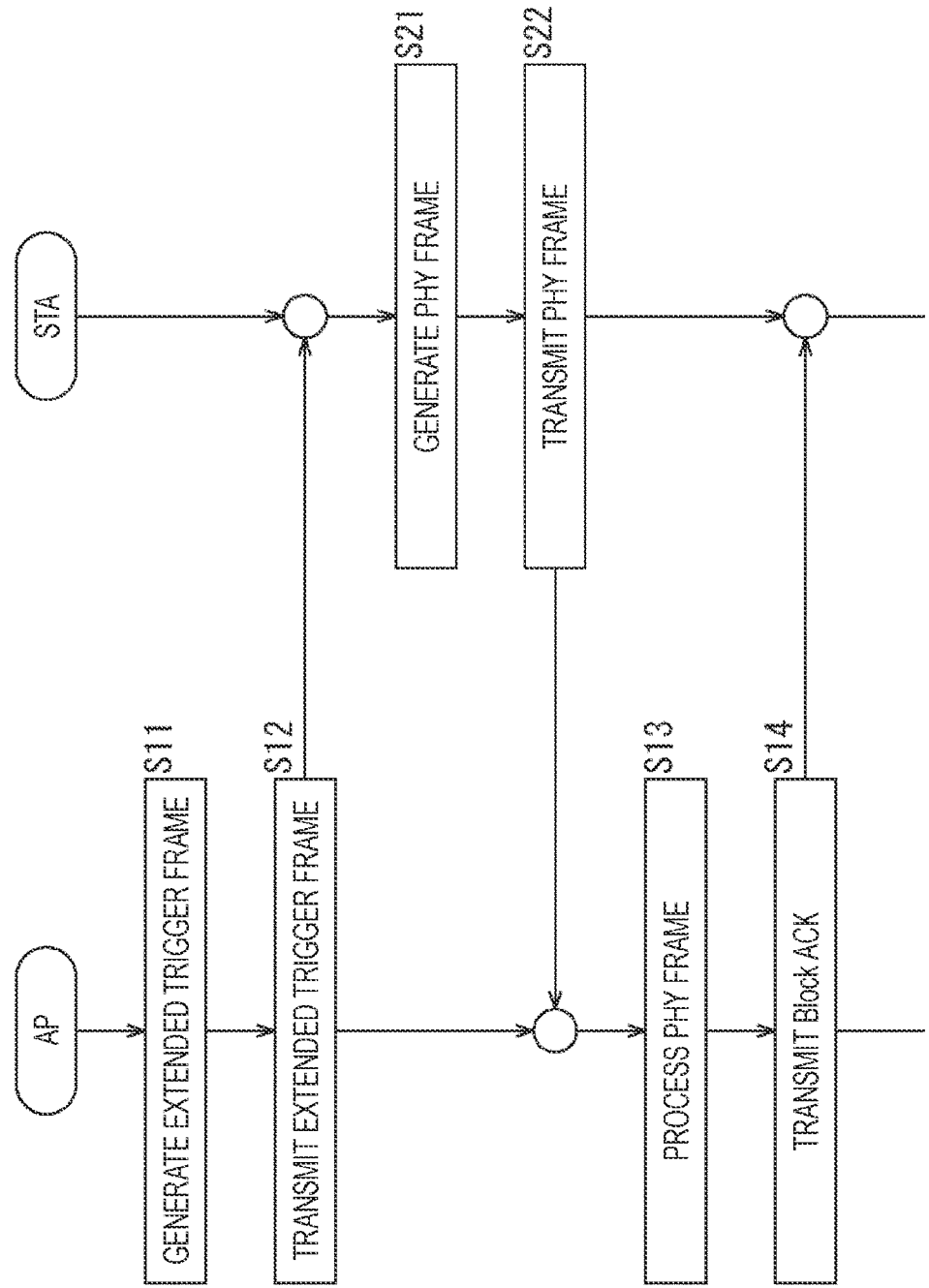
FIG. 11 is a flowchart that illustrates a series of a first example of processes between a base station and a terminal station.

First, the flowchart of FIG. 11 illustrates a series of transmission and receipt processes in a case where a terminal station STA is a transmission station, a base station AP is a receipt station, and uplink communication is performed.

Note that in FIG. 11, a process from steps S11 to S14 is performed by a control unit 101 of the base station AP (communication device 10), and a process from steps S21 to S22 is performed by a control unit 101 of the terminal station STA (communication device 10).

In step S11, the control unit 101 of the base station AP generates an extended trigger frame. The extended frame contains information such as redundancy information (information regarding the number of repetitions) and multiplexing information (frequency information).

In step S12, the control unit 101 of the base station AP controls a communication unit 103 to transmit the extended trigger frame that has been generated to the terminal station STA. The terminal station STA receives the extended trigger frame transmitted from the base station AP.

In step S21, the control unit 101 of the terminal station STA generates a PHY frame containing transmission data on the basis of information contained in the extended trigger frame that has been received.

In step S22, the control unit 101 of the terminal station STA controls a communication unit 103 on the basis of information contained in the extended trigger frame that has been received, to transmit the PHY frame that has been generated to the base station AP.

Here, the PHY frame is repeatedly transmitted on a frequency axis, on the basis of, for example, redundancy information (information regarding the number of repetitions) and multiplexing information (frequency information) that are contained in the extended trigger frame. The PHY frame that has been repeatedly transmitted on a frequency axis from the terminal station STA is received by the base station AP.

In step S13, the control unit 101 of the base station AP controls a data processing unit 102 and the communication unit 103 to process the PHY frame that has been received. Note that processed data (transmission data) obtained by processing the PHY frame is transferred to a protocol upper layer.

In step S14, the control unit 101 of the base station AP controls the communication unit 103 to transmit an acknowledgement frame (Block ACK) to the terminal station STA.

The series of transmission and receipt processes in a case where uplink communication is performed has been described above.

Figure 12:
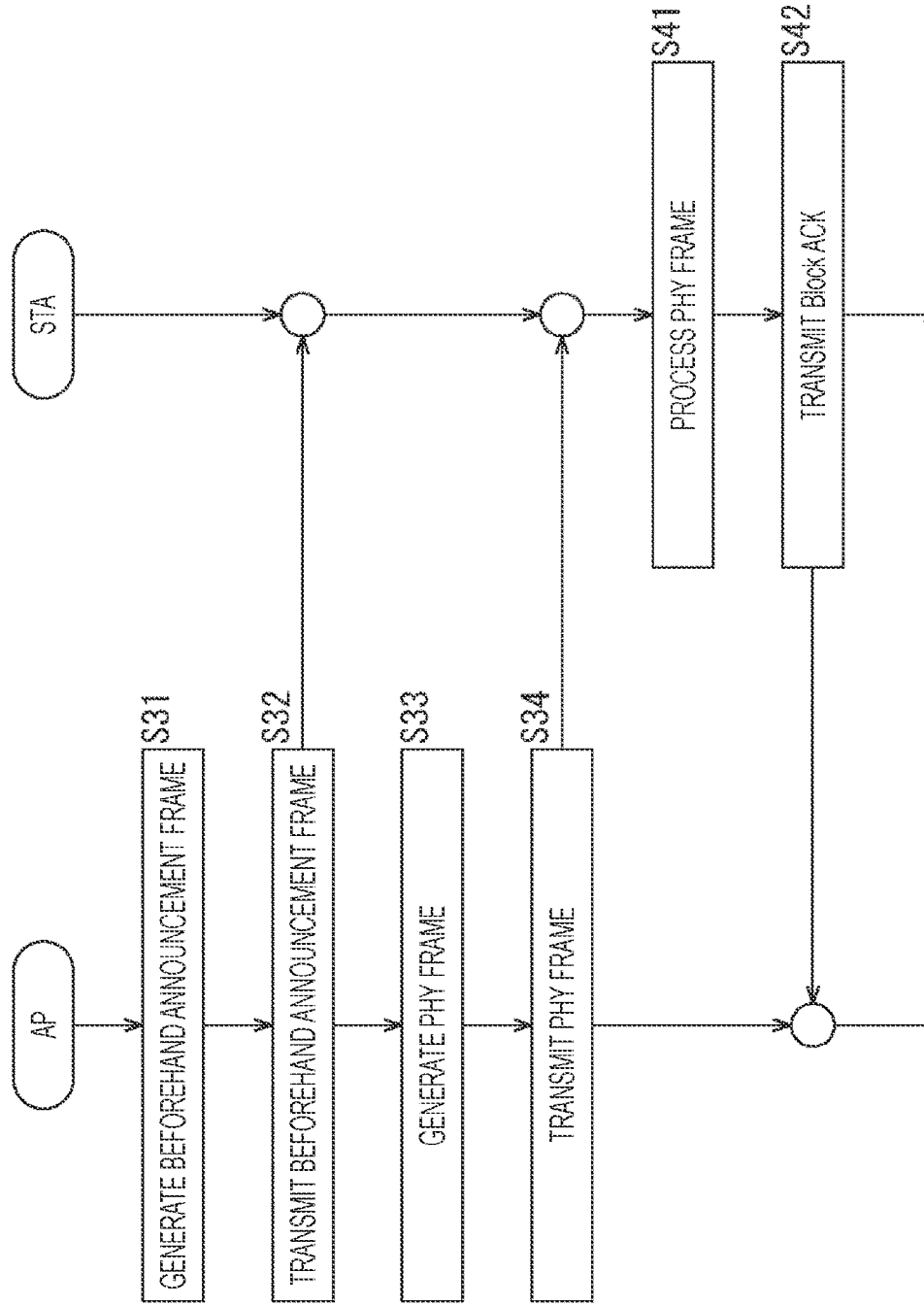
FIG. 12 is a flowchart that illustrates a series of a second example of processes between a base station and a terminal station.

Next, the flowchart of FIG. 12 illustrates a series of transmission and receipt processes in a case where a base station AP is a transmission station, a terminal station STA is a receipt station, and downlink communication is performed.

Note that in FIG. 12, a process from steps S31 to S34 is performed by a control unit 101 of the base station AP (communication device 10), and a process from steps S41 to S42 is performed by a control unit 101 of the terminal station STA (communication device 10).

In step S31, the control unit 101 of the base station AP generates a beforehand announcement frame. The beforehand announcement frame contains information such as redundancy information (information regarding the number of repetitions) and multiplexing information (frequency information).

In step S32, the control unit 101 of the base station AP controls a communication unit 103 to transmit the beforehand announcement frame that has been generated to the terminal station STA. The terminal station STA receives the beforehand announcement frame transmitted from the base station AP. Therefore, the terminal station STA can prepare for repeated transmission on a frequency axis by the base station AP, and the like.

In step S33, the control unit 101 of the base station AP generates a PHY frame containing transmission data on the basis of information contained in the beforehand announcement frame that has been generated.

In step S34, the control unit 101 of the base station AP controls the communication unit 103 on the basis of information contained in the beforehand announcement frame that has been generated, to transmit the PHY frame that has been generated to the terminal station STA.

Here, the PHY frame is repeatedly transmitted on a frequency axis, on the basis of, for example, redundancy information (information regarding the number of repetitions) and multiplexing information (frequency information) that are contained in the beforehand announcement frame. The PHY frame that has been repeatedly transmitted on a frequency axis from the base station AP is received by the terminal station STA.

In step S41, the control unit 101 of the terminal station STA controls a data processing unit 102 and a communication unit 103 to process the PHY frame that has been received. Note that processed data (transmission data) obtained by processing the PHY frame is transferred to a protocol upper layer.

In step S42, the control unit 101 of the terminal station STA controls the communication unit 103 to transmit an acknowledgement frame (Block ACK) to the base station AP.

The series of transmission and receipt processes in a case where downlink communication is performed has been described above.

2. Variations (Another Example of Configuration)

In the description above, in the communication device 10 (FIG. 2), the control unit 101 (FIG. 2) performs a control that provides redundancy for transmission data transmitted by a base station AP or a terminal station STA (for example, performs repeated transmission on a frequency axis). However, the communication unit 103 configured as a communication device such as a communication module or a chip for communication may have the control function.

Figure 13:
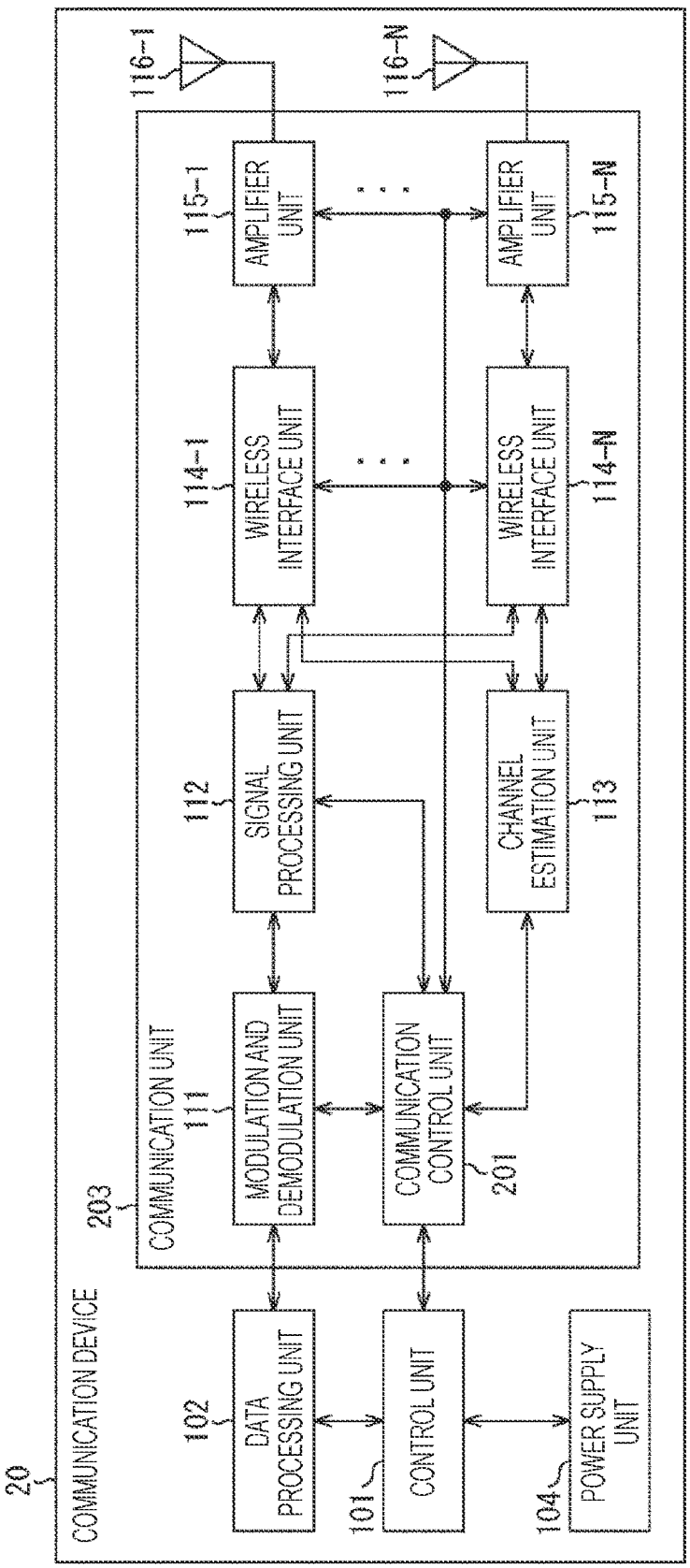
FIG. 13 is a block diagram that illustrates another example of configurations of an exemplary embodiment of a communication device to which the present technology is applied.
Figure 14:
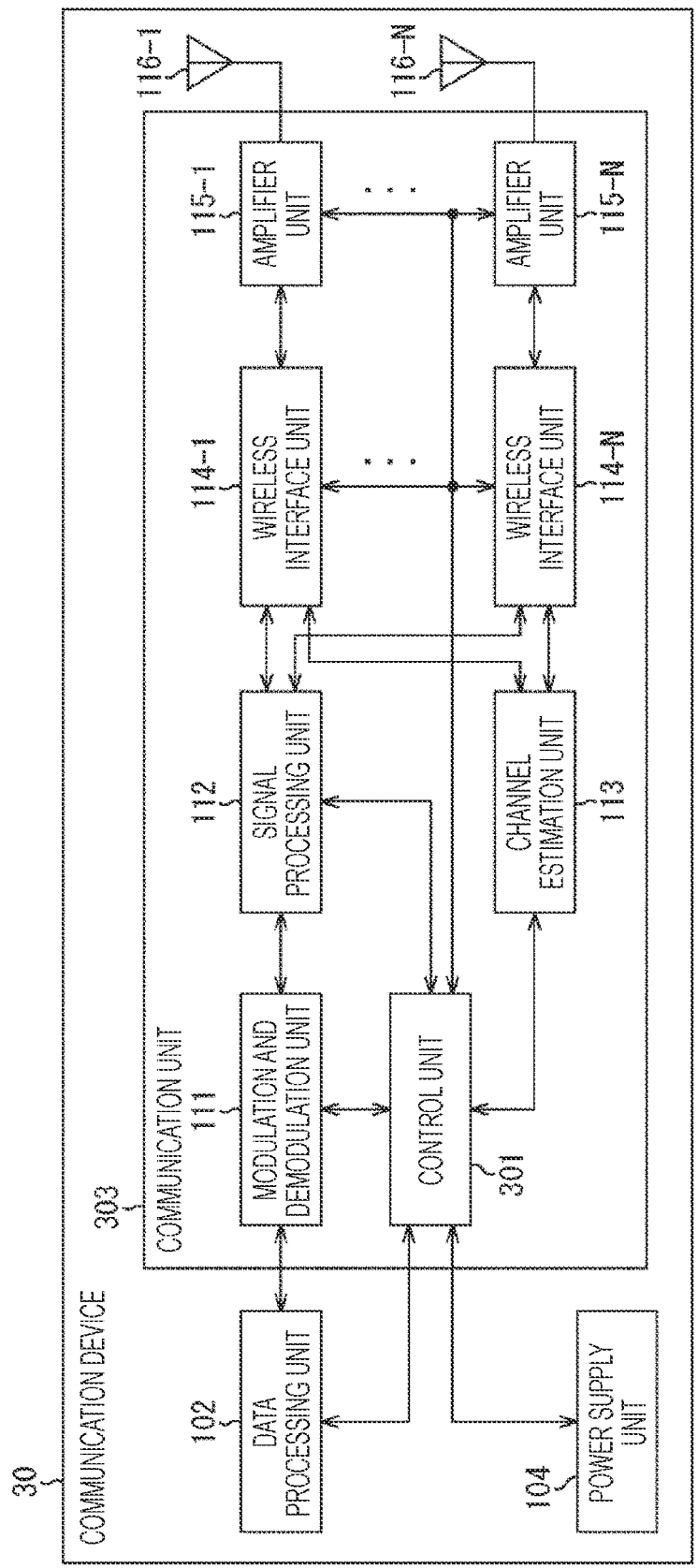
FIG. 14 is a block diagram that illustrates another example of configurations of an exemplary embodiment of a communication device to which the present technology is applied.

FIGS. 13 and 14 are block diagrams that illustrate other examples of configurations of an exemplary embodiment of a communication device (wireless communication device) to which the present technology is applied.

In FIG. 13, a communication device 20 includes a communication unit 203 instead of the communication unit 103, compared with the communication device 10 illustrated in FIG. 2. In addition to a modulation and demodulation unit 111 to amplifier units 115, a communication control unit 201 is added to the communication unit 203. Of functions of the control unit 101 (FIG. 2), the communication control unit 201 has the above control function of providing redundancy for transmission data transmitted by a base station AP or a terminal station STA. Note that of functions of the control unit 101 (FIG. 2), a control unit 101 in FIG. 13 has functions except for the above control function of providing redundancy for transmission data transmitted by a base station AP or a terminal station STA.

Furthermore, in FIG. 14, in a communication device 30, the control unit 101 is eliminated, and a communication unit 303 is provided instead of the communication unit 103, compared with the communication device 10 illustrated in FIG. 2. In addition to a modulation and demodulation unit 111 to amplifier units 115, a control unit 301 is added to the communication unit 303. The control unit 301 has functions similar to functions of the control unit 101 (FIG. 2) (all functions that include the above control function of providing redundancy for transmission data transmitted by a base station AP or a terminal station STA).

Note that the communication device 10, the communication device 20, and the communication device 30 may be configured as part of a device that constitutes a base station AP or a terminal station STA (for example, a communication module, a chip for communication, or the like). Furthermore, a terminal station STA can be configured as an electronic device that has a wireless communication function, such as a smartphone, a tablet terminal, a mobile phone, a personal computer, a digital camera, a game console, a television receiver, a wearable terminal, or a loudspeaker.

Furthermore, in the above description, communication naturally includes wireless communication, and may include communication that includes a combination of wireless communication and wired communication, that is, communication that includes wireless communication performed in a section, and wired communication performed in another section. Moreover, communication from a device to another device may be performed through wired communication, and communication from the another device to the device may be performed through wireless communication.

Note that exemplary embodiments of the present technology are not limited to the exemplary embodiments described above, but various modifications are possible within a scope that does not depart from the spirit of the present technology.

Furthermore, the present technology can be configured as follows:

(1)

A communication device that constitutes a base station, the communication device including:
- a control unit that performs a control that
  - generates redundancy information regarding a provision of redundancy for transmission data transmitted by a terminal station or the base station, and multiplexing information regarding multiplexing of the transmission data, and
  - transmits the redundancy information and the multiplexing information that have been generated to the terminal station.

(2)

The communication device according to (1),
in which the multiplexing information includes frequency information regarding frequency bands used at a time of a provision of redundancy for a first frame that contains the transmission data.

(3)

The communication device according to (2),
in which the control unit performs a control that receives the first frame transmitted from the terminal station and multiplexed on a frequency axis.

(4)

The communication device according to (2) or (3),
in which the redundancy information includes information regarding the number of repetitions at a time of transmission of the first frame.

(5)

The communication device according to (3),
in which the frequency information includes information regarding bandwidths of every channel of usage frequency bands that are available frequency bands.

(6)

The communication device according to (5),
in which the transmission data is compressed by compression ratios that correspond to the bandwidths, and the control unit performs a control that receives the transmission data contained in the first frame on the basis of priorities that correspond to the compression ratios.

(7)

The communication device according to (5) or (6), in which the frequency information further includes information regarding the usage frequency bands of the every channel.

(8)

The communication device according to (7), in which the transmission data is compressed by compression ratios that correspond to the bandwidths and the usage frequency bands, and the control unit performs a control that receives the transmission data contained in the first frame on the basis of priorities that correspond to the compression ratios.

(9)

The communication device according to any one of (1) to (8), in which the redundancy information and the multiplexing information are stored in a second frame used to cause transmission from a plurality of the terminal stations.

(10)

The communication device according to any one of (1) to (8), in which the redundancy information and the multiplexing information are stored in a header of a first frame that contains the transmission data.

(11)

The communication device according to (4), in which the control unit performs a control that generates the frequency information on the basis of a state of communication of another base station around the base station, and generates the redundancy information that includes information regarding the number of repetitions on the basis of a characteristic of the terminal station or information regarding a state of the terminal station.

(12)

The communication device according to (2), in which the redundancy information and the multiplexing information are stored in a third frame used to announce transmission to a particular terminal station of the terminal station beforehand, and the control unit performs a control that transmits the third frame to the particular terminal station of the terminal station before the first frame, and transmits the first frame multiplexed on a frequency axis to the particular terminal station of the terminal station on the basis of the redundancy information and the multiplexing information that have been generated.

(13)

The communication device according to any one of (1) to (12), in which the redundancy information includes information regarding the number of repetitions on a spatial axis, and the multiplexing information includes information regarding a spatial stream.

(14)

A communication method including allowing a communication device of a base station to:

generate redundancy information regarding a provision of redundancy for transmission data transmitted by a terminal station or the base station, and multiplexing information regarding multiplexing of the transmission data; and transmit the redundancy information and the multiplexing information that have been generated to the terminal station.

(15)

A communication device that constitutes a terminal station, the communication device including:

a control unit that performs a control that receives redundancy information and multiplexing information that are transmitted from a base station, the redundancy information being regarding a provision of redundancy for transmission data transmitted by the terminal station or the base station, and the multiplexing information being regarding multiplexing of the transmission data, and transmits a first frame that is a frame that contains the transmission data and is multiplexed to the base station, or receives the first frame multiplexed and transmitted from the base station, on the basis of the redundancy information and the multiplexing information that have been received.

(16)

The communication device according to (15), in which the multiplexing information includes frequency information regarding frequency bands used at a time of a provision of redundancy, and the control unit performs a control that transmits the first frame multiplexed on a frequency axis to the base station.

(17)

The communication device according to (16), in which the redundancy information includes information regarding the number of repetitions at a time of transmission of the first frame, and the control unit performs a control that repeatedly transmits the first frame to the base station, on a frequency axis.

(18)

The communication device according to (16), in which the frequency information includes information regarding bandwidths of every channel of usage frequency bands that are available frequency bands, and the control unit performs a control that transmits the first frame that contains the transmission data compressed by compression ratios that correspond to the bandwidths through frequency bands that correspond to the bandwidths.

(19)

The communication device according to (18), in which the frequency information further includes information regarding the usage frequency bands of the every channel, and the control unit performs a control that transmits the first frame that contains the transmission data compressed by compression ratios that correspond to the bandwidths and the usage frequency bands through frequency bands that correspond to the bandwidths and the usage frequency bands.

(20)

A communication method including allowing a communication device of a terminal station to:

receive redundancy information and multiplexing information that are transmitted from a base station, the redundancy information being regarding a provision of redundancy for transmission data transmitted by the terminal station or the base station, and the multiplexing information being regarding multiplexing of the transmission data; and transmit a first frame that is a frame that contains the transmission data and is multiplexed to the base station, or receive the first frame multiplexed and transmitted from the base station, on the basis of the redundancy information and the multiplexing information that have been received.

REFERENCE SIGNS LIST 10, 20, 30 Communication device
101 Control unit
102 Data processing unit
103 Communication unit
104 Power supply unit
111 Modulation and demodulation unit
112 Signal processing unit
113 Channel estimation unit
114, and 114-1 to 114-N Wireless interface unit
115, and 115-1 to 115-N Amplifier unit
116, and 116-1 to 116-N Antenna
201 Communication control unit
203 Communication unit
301 Control unit
303 Communication unit
AP Base station
BSS Network
STA Terminal station

The invention claimed is:

1. A communication device that constitutes a first base station, the communication device comprising:
a microprocessor configured to:
perform control to:
generate redundancy information regarding a provision of redundancy for transmission data transmitted by one of a terminal station or the first base station, wherein
the redundancy information includes information regarding a number of repetitions at a time of transmission of a first frame that includes the transmission data, and
the redundancy information is generated based on one of a characteristic of the terminal station or information regarding a state of the terminal station; and
generate multiplexing information regarding multiplexing of the transmission data, wherein
the multiplexing information includes frequency information regarding frequency bands used at a time of the provision of redundancy for the first frame, and
the frequency information is generated based on a state of communication of a second base station around the first base station; and
control the communication device to transmit the redundancy information and the multiplexing information to the terminal station.

2. The communication device according to claim 1, wherein the microprocessor is further configured to control the communication device to receive the first frame transmitted from the terminal station and multiplexed on a frequency axis.

3. The communication device according to claim 2, wherein
the frequency information includes information regarding bandwidths of every channel of usage frequency bands of the frequency bands, and
the usage frequency bands are available frequency bands.

4. The communication device according to claim 3, wherein
the transmission data is compressed by compression ratios that correspond to the bandwidths,
the microprocessor is further configured to control the communication device to receive the transmission data included in the first frame, and
the reception of the transmission data included in the first frame is based on a plurality of first priorities that correspond to the compression ratios.

5. The communication device according to claim 3, wherein the frequency information further includes information regarding the usage frequency bands of the every channel.

6. The communication device according to claim 5, wherein
the transmission data is compressed by compression ratios that correspond to the bandwidths and the usage frequency bands, and
the microprocessor is further configured to control the communication device to receive the transmission data contained in the first frame based a pluralities of second priorities that correspond to the compression ratios.

7. The communication device according to claim 1, wherein
the redundancy information and the multiplexing information are stored in a second frame transmitted from a plurality of terminal stations, and
the plurality of terminal stations includes the terminal station.

8. The communication device according to claim 1, wherein the redundancy information and the multiplexing information are stored in a header of the first frame that includes the transmission data.

9. The communication device according to claim 1, wherein
the redundancy information and the multiplexing information are stored in a second frame used to announce transmission to a particular terminal station of the terminal station beforehand, and
the microprocessor is further configured to:
control the communication device to transmit the second frame to the particular terminal station of the terminal station before the first frame, and
transmit the first frame multiplexed on a frequency axis to the particular terminal station of the terminal station based on the redundancy information and the multiplexing information.

10. A communication method, comprising:
allowing a communication device of a first base station to:
generate redundancy information regarding a provision of redundancy for transmission data transmitted by one of a terminal station or the first base station, wherein
the redundancy information includes information regarding a number of repetitions at a time of transmission of a first frame including the transmission data, and the redundancy information is generated based on one of a characteristic of the terminal station or information regarding a state of the terminal station; and generate multiplexing information regarding multiplexing of the transmission data, wherein
the multiplexing information includes frequency information regarding frequency bands used at a time of the provision of redundancy for the first frame, and
the frequency information is generated based on a state of communication of a second base station around the first base station; and transmit the redundancy information and the multiplexing information to the terminal station.

11. A communication device that constitutes a terminal station, the communication device comprising:
a microprocessor configured to:
control the communication device to:
receive redundancy information and multiplexing information that are transmitted from a base station, wherein
the redundancy information is regarding a provision of redundancy for transmission data transmitted by one of the terminal station or the base station,
the multiplexing information is regarding multiplexing of the transmission data,
the multiplexing information includes frequency information regarding frequency bands used at a time of the provision of redundancy,
the frequency information includes information regarding bandwidths of every channel of usage frequency bands of the frequency bands, and
the usage frequency bands are available frequency bands, and
based on the redundancy information and the multiplexing information, transmit a specific frame multiplexed on a frequency axis to the base station, or receive the specific frame multiplexed and transmitted from the base station, wherein
the specific frame is multiplexed to the base station, and
the specific frame includes the transmission data compressed by compression ratios that correspond to the bandwidths through frequency bands that correspond to the bandwidths.

12. The communication device according to claim 11, wherein
the redundancy information includes information regarding a number of repetitions at a time of transmission of the specific frame that includes the transmission data, and
the microprocessor is further configured to control the communication device to repeatedly transmit the specific frame to the base station, on the frequency axis.

13. The communication device according to claim 11, wherein the frequency information further includes information regarding the usage frequency bands of the every channel, and
the specific frame further includes the transmission data compressed by compression ratios that correspond to the bandwidths and the usage frequency bands through frequency bands that correspond to the bandwidths and the usage frequency bands.

14. A communication method, comprising:
allowing a communication device of a terminal station to:
receive redundancy information and multiplexing information that are transmitted from a base station, wherein
the redundancy information is regarding a provision of redundancy for transmission data transmitted by one of the terminal station or the base station,
the multiplexing information is regarding multiplexing of the transmission data,
the multiplexing information includes frequency information regarding frequency bands used at a time of the provision of redundancy,
the frequency information includes information regarding bandwidths of every channel of usage frequency bands of the frequency bands, and
the usage frequency bands are available frequency bands; and
based on the redundancy information and the multiplexing information, transmit a specific frame multiplexed on a frequency axis to the base station, or receive the specific frame multiplexed and transmitted from the base station, wherein
the specific frame is multiplexed to the base station, and
the specific frame includes the transmission data compressed by compression ratios that correspond to the bandwidths through frequency bands that correspond to the bandwidths.

15. A communication device that constitutes a base station, the communication device comprising:
a microprocessor configured to:
perform control to:
generate redundancy information regarding a provision of redundancy for transmission data transmitted by one of a terminal station or the base station; and
generate multiplexing information regarding multiplexing of the transmission data; and
control the communication device to transmit the redundancy information and the multiplexing information to the terminal station, wherein
the redundancy information includes information regarding a number of repetitions on a spatial axis, and
the multiplexing information includes information regarding a spatial stream.

\* \* \* \* \*